(12) United States Patent
Suwabe

(10) Patent No.: US 7,760,380 B2
(45) Date of Patent: Jul. 20, 2010

(54) IMAGE FORMING APPARATUS, CONTROL METHOD THEREOF, IMAGE FORMING SYSTEM, AND PROGRAM

(75) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1171 days.

(21) Appl. No.: 11/061,779

(22) Filed: Feb. 22, 2005

(65) Prior Publication Data

US 2005/0185214 A1 Aug. 25, 2005

(30) Foreign Application Priority Data

Feb. 25, 2004 (JP) .............................. 2004-049937

(51) Int. Cl.
*G06F 15/00* (2006.01)
(52) U.S. Cl. ...................... 358/1.15; 358/1.1; 358/1.16; 358/401; 358/403; 382/305; 715/229
(58) Field of Classification Search ................ 358/1.15, 358/1.16, 403, 401, 444; 382/305; 707/203
See application file for complete search history.

(56) References Cited

U.S. PATENT DOCUMENTS

| | | | | |
|---|---|---|---|---|
| 5,809,167 A | * | 9/1998 | Al-Hussein | 382/190 |
| 5,893,908 A | * | 4/1999 | Cullen et al. | 1/1 |
| 6,061,478 A | * | 5/2000 | Kanoh et al. | 382/305 |
| 6,263,121 B1 | * | 7/2001 | Melen et al. | 382/305 |
| 6,618,166 B1 | * | 9/2003 | Suzue | 358/1.15 |
| 6,628,412 B1 | * | 9/2003 | Jeran et al. | 358/1.14 |
| 6,934,042 B1 | * | 8/2005 | Morita et al. | 358/1.15 |
| 2004/0027604 A1 | * | 2/2004 | Jeran et al. | 358/1.14 |
| 2004/0032614 A1 | * | 2/2004 | Tanaka et al. | 358/1.15 |
| 2005/0185214 A1 | | 8/2005 | Suwabe | 358/1.15 |

FOREIGN PATENT DOCUMENTS

| | | |
|---|---|---|
| JP | 11068823 | 3/1999 |
| JP | 11-205558 | 7/1999 |
| JP | 2000-341455 | 12/2000 |
| JP | 2001524715 | 12/2001 |
| JP | 2002094722 | 3/2002 |
| JP | 2003-134325 | 5/2003 |
| WO | 9927467 | 6/1999 |

OTHER PUBLICATIONS

U.S. Appl. No. 11/197,511, filed Aug. 5, 2005.

* cited by examiner

*Primary Examiner*—Twyler L Haskins
*Assistant Examiner*—Kent Yip
(74) *Attorney, Agent, or Firm*—Fitzpatrick, Cella, Harper & Scinto

(57) ABSTRACT

Function information related to a plurality of kinds of functions arranged in a first image forming apparatus is acquired. The acquired function information is displayed. A desired function is designated from the displayed functions. A document containing the identification information is read on the basis of the designated function. The read document image is transmitted to the first image forming apparatus through a network. The identification information of original data corresponding to the document image is received from the first image forming apparatus through the network.

9 Claims, 23 Drawing Sheets

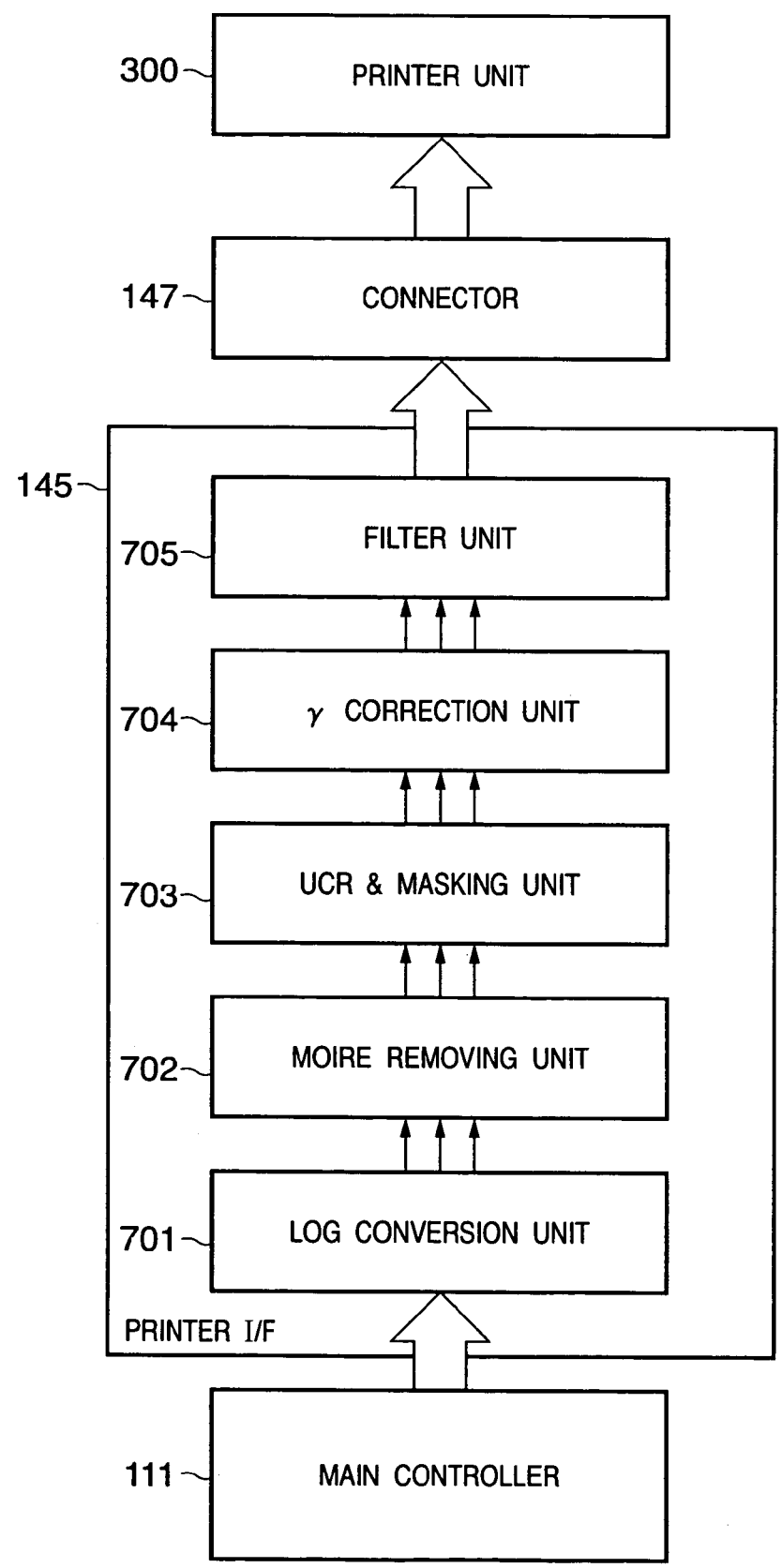

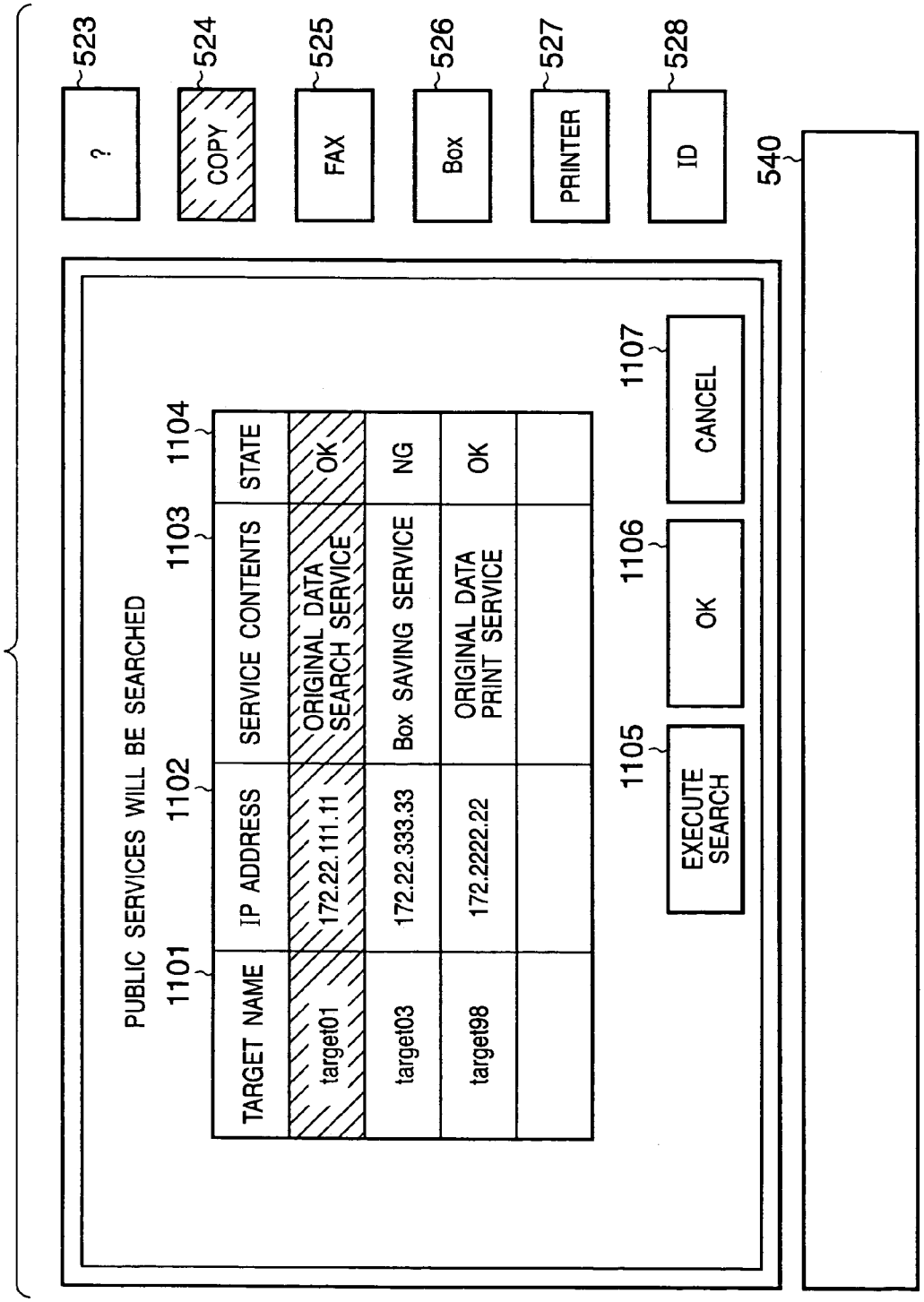

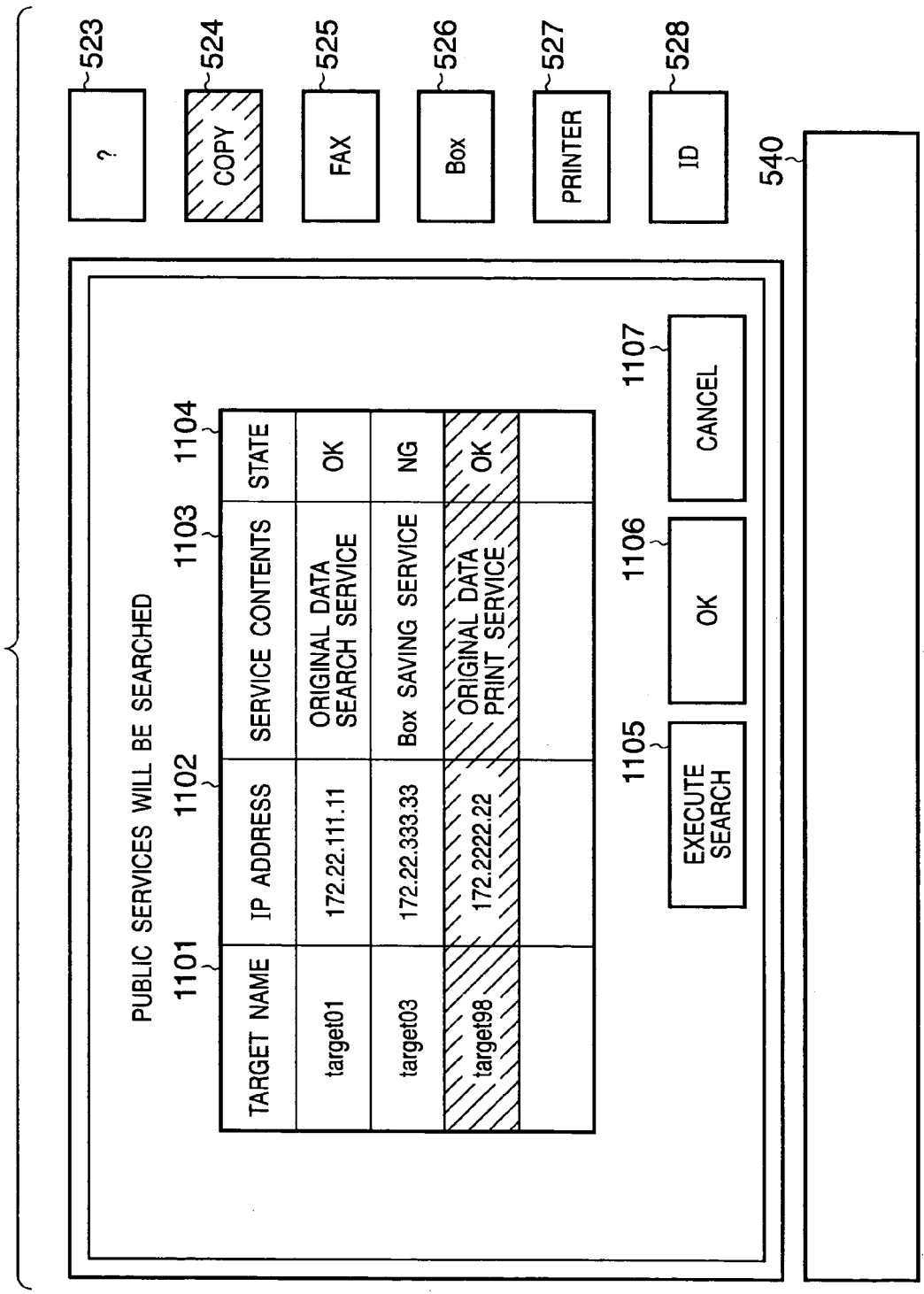

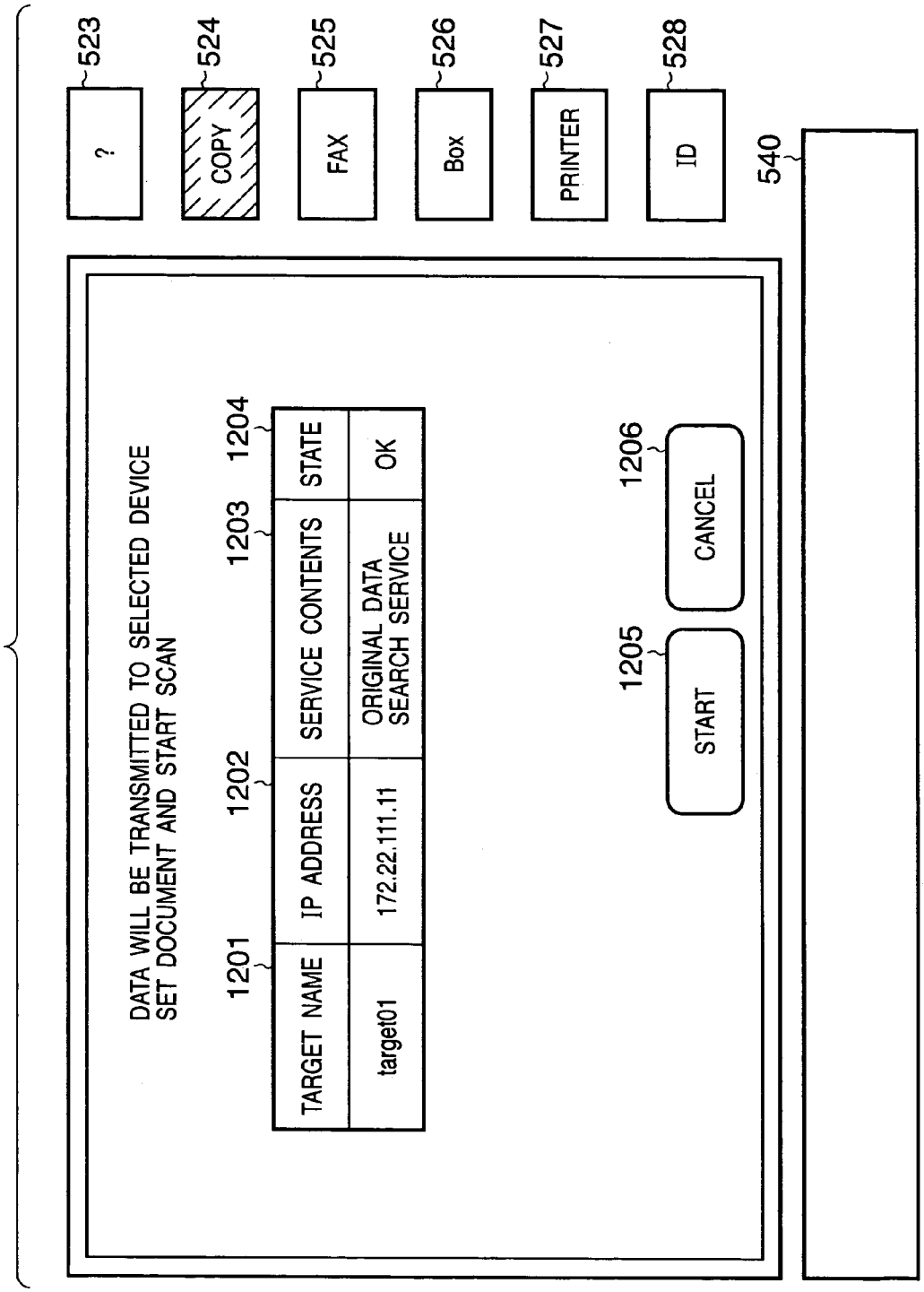

IMAGE FORMING APPARATUS, CONTROL METHOD THEREOF, IMAGE FORMING SYSTEM, AND PROGRAM

FIELD OF THE INVENTION

The present invention relates to an image forming system formed by connecting a first image forming apparatus having a function of interpreting identification information containing the storage location of original data corresponding to an original image to a second image forming apparatus through a network, the first and second image forming apparatuses included in the system, a control method thereof, and a program.

BACKGROUND OF THE INVENTION

An image forming apparatus is disclosed in Japanese Patent Laid-Open No. 11-205558 as a prior art.

In Japanese Patent Laid-Open No. 11-205558, for example, image data is managed by a server. When an image corresponding to image data is printed on a printing paper sheet by an image forming apparatus, a printout is generated by printing a barcode representing the management location of the image data on only the first printing paper sheet. When the printout is to be copied some time later using the scanner function and the printer function of the image forming apparatus, the barcode portion of the printout is read by the scanner function. Original data (image data) corresponding to the printout, which is specified by the read barcode, is acquired from the server and printed by using the printer function.

In Japanese Patent Laid-Open No. 11-205558, however, the above-described specific function itself can be used in only the image forming apparatus having this specific function. For this reason, utilization may concentrate on the image forming apparatus with this function. Alternatively, if this specific function is necessary, a new image forming apparatus having this function must be prepared.

In addition, when original data is read out and printed, and then, the user wants to print the same data, the procedures including scan, search, and print must be repeated, resulting in low operation efficiency.

SUMMARY OF THE INVENTION

The present invention has been made to solve the above-described problems, and has as its object to provide an image forming apparatus which allows an image forming apparatus having no specific function to use another image forming apparatus with a specific function and improves the operation efficiency of the entire system, a control method thereof, an image forming system, and a program.

According to the present invention, the foregoing object is attained by providing an image forming apparatus which is connected, through a network, to a first image forming apparatus having an interpretation function of identification information containing the storage location of original data corresponding to a document image, comprising:

an acquisition unit, adapted to acquire function information related to a plurality of kinds of functions arranged in the first image forming apparatus;

a function information display unit, adapted to display the function information acquired by the acquisition unit;

a designation unit, adapted to designate a desired function from the functions displayed by the function information display unit;

a read unit, adapted to read the document containing the identification information based on the function designated by the designation unit;

a document image transmission unit, adapted to transmit the document image read by the read unit to the first image forming apparatus through the network; and an identification information reception unit, adapted to receive for receiving the identification information of the original data corresponding to the document image from the first image forming apparatus through the network.

In a preferred embodiment, the plurality of kinds of functions include a search function, print function, saving function, data transmission function, and facsimile transmission function of the original data corresponding to the identification information.

In a preferred embodiment, the apparatus further comprises a storage unit adapted to store the identification information received by the identification information reception unit, an identification information display unit adapted to display the identification information stored in the storage unit, an identification information designation unit adapted to designate the identification information displayed by the identification information display unit, an identification information transmission unit adapted to transmit the identification information designated by the identification information designation unit to the first image forming apparatus through the network, and an original data reception unit adapted to receive the original data corresponding to the identification information transmitted by the identification information transmission unit.

In a preferred embodiment, the apparatus further comprises a print unit adapted to print the original data received by the original data reception unit when the function designated by the designation unit is the print function.

In a preferred embodiment, a print instruction by the print unit is issued from either the image forming apparatus or the first image forming apparatus.

In a preferred embodiment, the identification information reception unit receives a thumbnail image of the original data in addition to the identification information, and the storage unit stores the identification information and the thumbnail image.

In a preferred embodiment, the apparatus further comprises thumbnail image display unit adapted to display the thumbnail image stored in the storage unit.

In a preferred embodiment, the original data is managed by one of the first image forming apparatus and an external device on the network.

According to the present invention, the foregoing object is attained by providing an image forming apparatus which is connected to a second image forming apparatus through a network and has an interpretation function of identification information containing the storage location of original data corresponding to a document image, comprising:

an acquisition request reception unit, adapted to receive, from the second image forming apparatus through the network, an acquisition request of function information related to a plurality of kinds of functions arranged in the image forming apparatus;

a function information transmission unit, adapted to transmit the function information on the basis of the acquisition request received by the acquisition request reception unit;

a document image reception unit, adapted to receive the document image containing the identification information from the second image forming apparatus through the network;

an interpretation unit, adapted to interpret the identification information contained in the document image received by the document image reception unit;

a specifying unit, adapted to specify the original data corresponding to the document image on the basis of an interpretation result by the interpretation unit; and an identification information transmission the identification information of the original data specified by the specifying unit to the second image forming apparatus through the network.

According to the present invention, the foregoing object is attained by providing an image forming system formed by connecting a first image forming apparatus having an interpretation function of identification information containing a storage location of original data corresponding to a document image to a second image forming apparatus through a network, wherein the first image forming apparatus comprises:

an acquisition request reception unit, adapted to receive, from the second image forming apparatus through the network, an acquisition request of function information related to a plurality of kinds of functions arranged in the image forming apparatus;

a transmission unit, adapted to transmit the function information on the basis of the acquisition request received by the acquisition request reception unit;

a document image reception unit, adapted to receive the document image containing the identification information from the second image forming apparatus through the network;

an interpretation unit, adapted to interpret the identification information contained in the document image received by the document image reception unit;

a specifying unit, adapted to specify the original data corresponding to the document image on the basis of an interpretation result by the interpretation unit; and an identification information transmission unit, adapted to transmit the identification information of the original data specified by the specifying unit to the second image forming apparatus through the network, and the second image forming apparatus comprises:

an acquisition unit, adapted to acquire the function information of the first image forming apparatus;

a function information display unit, adapted to display the function information acquired by the acquisition unit;

a designation unit, adapted to designate a desired function from the functions displayed by the function information display unit;

a read unit, adapted to read the document containing the identification information on the basis of the function designated by the designation unit;

a document image transmission unit, adapted to transmit the document image read by the read unit to the first image forming apparatus through the network; and an identification information reception unit, adapted to receive the identification information of the original data corresponding to the document image from the first image forming apparatus through the network.

According to the present invention, the foregoing object is attained by providing a control method of an image forming apparatus which is connected, through a network, to a first image forming apparatus having an interpretation function of identification information containing the storage location of original data corresponding to a document image, comprising:

an acquisition step of acquiring function information related to a plurality of kinds of functions arranged in the first image forming apparatus;

a function information display step of displaying the function information acquired in the acquisition step;

a designation step of designating a desired function from the functions displayed in the function information display step;

a read step of reading the document containing the identification information on the basis of the function designated in the designation step;

a document image transmission step of transmitting the document image read in the read step to the first image forming apparatus through the network; and an identification information reception step of receiving the identification information of the original data corresponding to the document image from the first image forming apparatus through the network.

According to the present invention, the foregoing object is attained by providing a control method of an image forming apparatus which is connected to a second image forming apparatus through a network and has an interpretation function of identification information containing the storage location of original data corresponding to a document image, comprising:

an acquisition request reception step of receiving, from the second image forming apparatus through the network, an acquisition request of function information related to a plurality of kinds of functions arranged in the image forming apparatus;

a function information transmission step of transmitting the function information on the basis of the acquisition request received in the acquisition request reception step;

a document image reception step of receiving the document image containing the identification information from the second image forming apparatus through the network;

an interpretation step of interpreting the identification information contained in the document image received in the document image reception step;

a specifying step of specifying the original data corresponding to the document image on the basis of an interpretation result in the interpretation step; and an identification information transmission step of transmitting the identification information of the original data specified in the specifying step to the second image forming apparatus through the network.

According to the present invention, the foregoing object is attained by providing a program which implements control of an image forming apparatus which is connected, through a network, to a first image forming apparatus having an interpretation function of identification information containing the storage location of original data corresponding to a document image, comprising:

a program code for an acquisition step of acquiring function information related to a plurality of kinds of functions arranged in the first image forming apparatus;

a program code for a function information display step of displaying the function information acquired in the acquisition step;

a program code for a designation step of designating a desired function from the functions displayed in the function information display step;

a program code for a read step of reading the document containing the identification information on the basis of the function designated in the designation step;

a program code for a document image transmission step of transmitting the document image read in the read step to the first image forming apparatus through the network; and a program code for an identification information reception step of receiving the identification information of the original data corresponding to the document image from the first image forming apparatus through the network.

According to the present invention, the foregoing object is attained by providing a program which implements control of an image forming apparatus which is connected to a second image forming apparatus through a network and has an interpretation function of identification information containing the storage location of original data corresponding to a document image, comprising:

a program code for an acquisition request reception step of receiving, from the second image forming apparatus through the network, an acquisition request of function information related to a plurality of kinds of functions arranged in the image forming apparatus;

a program code for a function information transmission step of transmitting the function information on the basis of the acquisition request received in the acquisition request reception step;

a program code for a document image reception step of receiving the document image containing the identification information from the second image forming apparatus through the network;.

a program code for an interpretation step of interpreting the identification information contained in the document image received in the document image reception step;

a program code for a specifying step of specifying the original data corresponding to the document image on the basis of an interpretation result in the interpretation step; and a program code for an identification information transmission step of transmitting the identification information of the original data specified in the specifying step to the second image forming apparatus through the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a block diagram showing the detailed arrangement of the image processing unit of a printer I/F according to the first embodiment of the present invention;

FIG. 9A is a view showing an example of a service search result window according to the first embodiment of the present invention;

FIG. 9B is a view showing another example of the service search result window according to the first embodiment of the present invention;

FIG. 10 is a view showing an example of an original data search service execution window according to the first embodiment of the present invention;

DETAILED DESCRIPTION OF THE PREFERRED EMBODIMENTS

Preferred embodiments of the present invention will be described in detail in accordance with the accompanying drawings.

First Embodiment

In the first embodiment, an image input/output system will be described, in which image data managed by a first image forming apparatus is acquired and printed by a second image forming apparatus.

The first image forming apparatus has a specific function of reading a document with identification information (document ID: barcode or digital watermark information), acquiring the original information (original electronic document (containing, e.g., image data, vector data, and text data)) of the document, which is stored in advance and specified by the identification information, and printing the original information (original electronic document) as a copy of the read document in accordance with procedures as in normal copy.

To the contrary, the second image forming apparatus does not have the above-described specific function of the first image forming apparatus.

Especially, in the first embodiment, the second image forming apparatus reads a document with identification information and transmits the image data to the first image forming apparatus. The first image forming apparatus determines the document ID to specify the original electronic document corresponding to the identification information in the received image data and transmits the document ID to the second image forming apparatus.

The second image forming apparatus receives, by using the received document ID, the corresponding original electronic document managed by the first image forming apparatus and executes various kinds of processing such as saving, printing, facsimile transmission, and data transmission of the original electronic document.

In the first embodiment, a processing instruction (e.g., print instruction) for the original electronic document is input from the second image forming apparatus. The original electronic document is managed by the first image forming apparatus. This arrangement is merely an example, and the present invention is not limited to this.

The overall arrangement of the image input/output system according to the first embodiment will be described with reference to FIG. 1.

Figure 1:
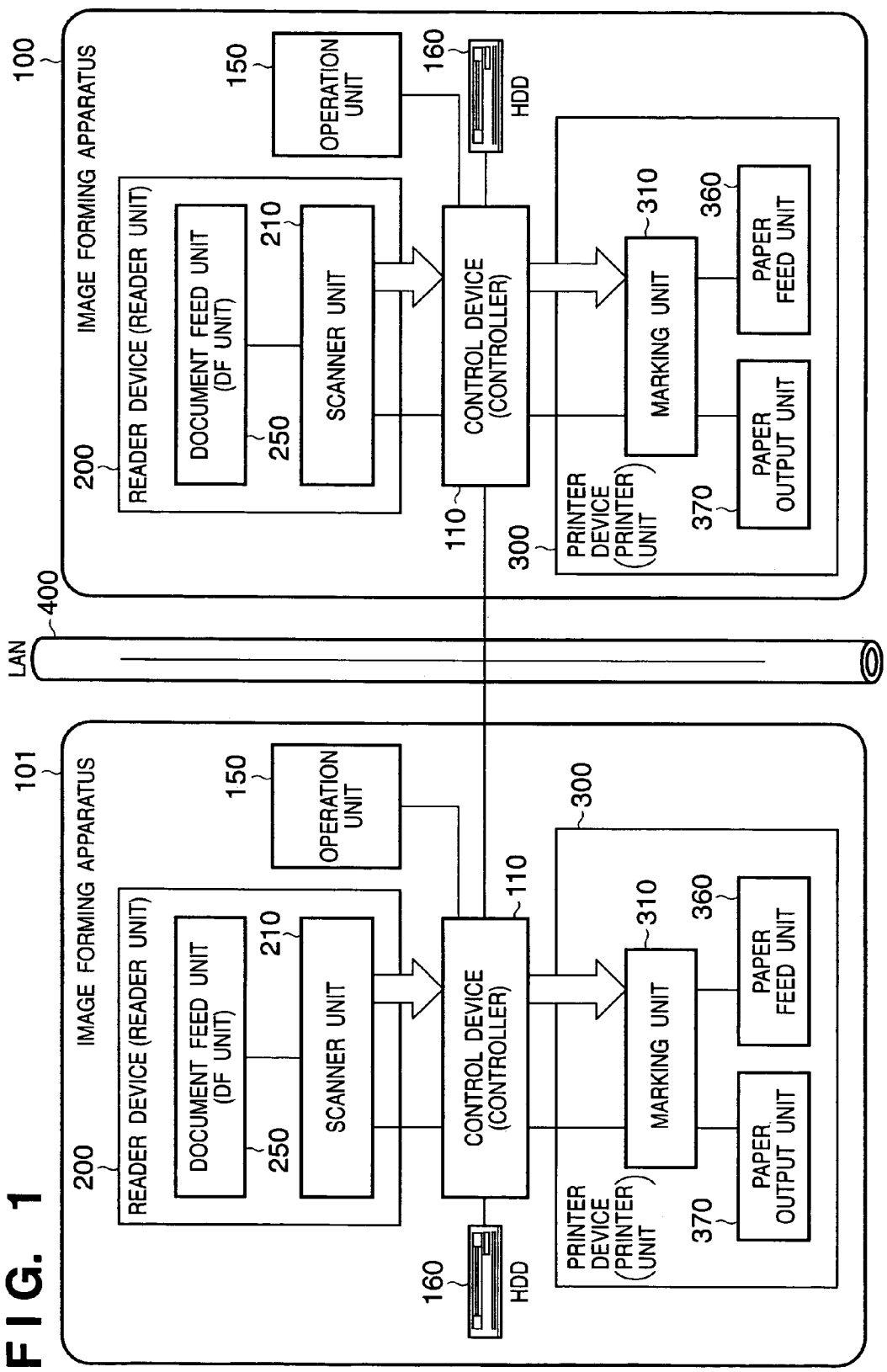
FIG. 1 is a view showing the overall arrangement of an image input/output system according to the first embodiment of the present invention.

FIG. 1 is a view showing the overall arrangement of the image input/output system according to the first embodiment of the present invention.

An image forming apparatus 100 is the first image forming apparatus according to the present invention, which has a function of searching for an original electronic document as a specific function. An image forming apparatus 101 is the second image forming apparatus having no specific function. Since the overall arrangement is common to both apparatuses, the arrangement of one of them will be described below.

A reader unit (image input device) 200 optically reads a document image and converts it into image data. The reader unit 200 includes a scanner unit 210 serving as a scanner function of reading a document and a document feed unit (DF unit) 250 serving as a conveyance function of conveying a document paper sheet.

A printer unit (image output device) 300 conveys a printing paper sheet, prints image data on it as a visible image, and outputs the paper sheet from the apparatus. The printer unit 300 includes a paper feed unit 360 having a plurality of kinds of printing paper sheet cassettes, a marking unit 310 having a function of transferring and fixing image data onto a printing paper sheet, and a paper output unit 370 having a function of outputting a printing paper sheet with an image printed thereon from the apparatus.

Printing paper sheets include not only paper sheets used in general printing apparatuses but also cloth, plastic film, and metal plate. The paper output unit 370 also has a finishing function of sorting or stapling printing paper sheets with images printed thereon.

A control device (controller unit) 110 is electrically connected to the reader unit 200 and printer unit 300 and also connected to a LAN 400.

The control device 110 provides a copy function of controlling the reader unit 200 to read the image data of a document and controlling the printer unit 300 to output the image data to a printing paper sheet.

The control device 110 also provides a scanner function of converting the image data read from the reader unit 200 into code data and transmitting it to a host computer (not shown) through the LAN 400 and a printer function of converting the code data received from the host computer through the LAN 400 into image data and outputting it to the printer unit 300.

An operation unit 150 is connected to the control device 110. The operation unit 150 includes, e.g., a liquid crystal touch panel, ten-key pad, and various kinds of buttons and provides a user I/F (interface) to operate the image input/output system. A keyboard or pointing device (mouse) can be connected as needed.

A hard disk drive (HDD) 160 stores image data read by the reader unit 200 or image data received through a communication line. Especially, in the first embodiment, an image database which stores image data in correspondence with their additional data, i.e., thumbnail image information and address information representing the storage locations of the image data is formed in the first image forming apparatus.

For the image forming apparatus 100 serving as the first image forming apparatus and the image forming apparatus 101 serving as the second image forming apparatus, IP addresses and network user names capable of distinguishing them on the same network (LAN 400) are set. Referring to FIG. 1, the image forming apparatuses are connected to the LAN 400. Alternatively, they may be connected to another network such as a WAN or Internet.

<Description of Control Device>

The detailed arrangement of the control device 110 will be described next with reference to FIG. 2.

Figure 2:
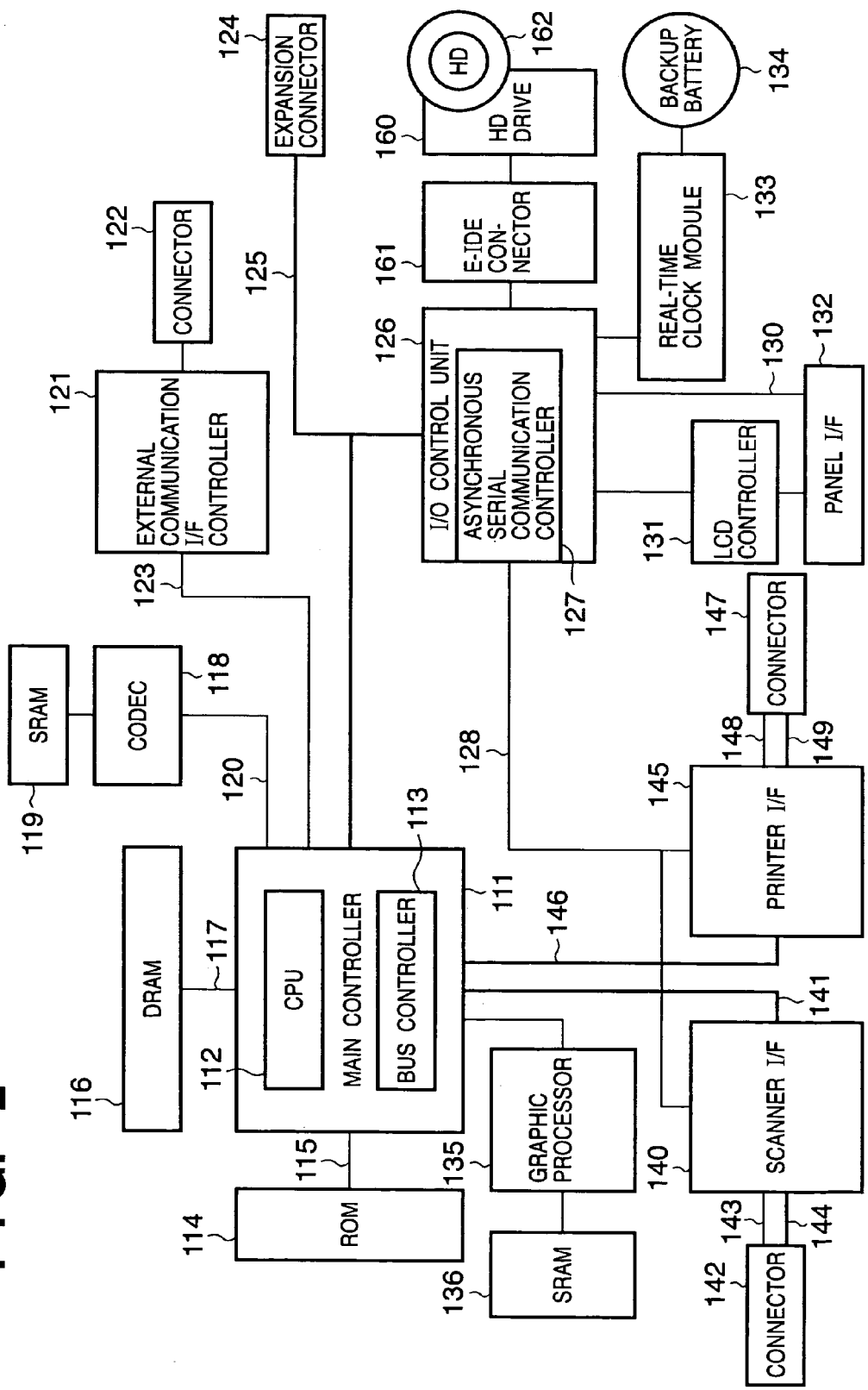
FIG. 2 is a view showing the detailed arrangement of a control device according to the first embodiment of the present invention.

FIG. 2 is a view showing the detailed arrangement of the control device according to the first embodiment of the present invention.

The arrangement of the control device 110 is almost common to the image forming apparatuses 100 and 101, and the arrangement in one of them will be described below. Different parts will be described as needed.

A main controller 111 mainly includes a CPU 112, bus controller 113, and various kinds of I/F controller circuits (not shown).

The CPU 112 and bus controller 113 control the operation of the entire control device 110. The CPU 112 operates on the basis of a program loaded from a ROM 114 through a ROM I/F 115. An operation of interpreting PDL (Page Description Language) code data received from the host computer and bitmapping the data into raster image data is also described in this program and processed by software.

The bus controller 113 controls transfer of data input/output from/to each I/F controller circuit. The bus controller 113 executes arbitration in bus conflict or controls DMA data transfer.

A DRAM 116 is connected to the main controller 111 through a DRAM I/F 117. The DRAM 116 is used as a work area for the CPU 112 to operate or an area to store image data.

A Codec 118 compresses raster image data stored in the DRAM 116 by a compression method such as MH, MR, MMR, JBIG, or JPEG or expands compressed and stored code data into raster image data.

An SRAM 119 is used as a temporary work area of the Codec 118. The Codec 118 is connected to the main controller 111 through an I/F 120. Data transfer between the Codec 118 and the DRAM 116 is done as DMA transfer and controlled by the bus controller 113.

A graphic processor 135 executes processing such as image rotation/scaling and extraction/interpretation and generation/embedding of barcode information/digital watermark information according to the present invention.

An external commutation I/F controller 121 is connected to the main controller 111 through an I/F 123 and to an external network through a connector 122.

An expansion connector 124 to connect an expansion board and an I/O control unit 126 are connected to a general-purpose high-speed bus 125. A PCI bus is generally used as the general-purpose high-speed bus.

The I/O control unit 126 includes an asynchronous serial communication controller 127 having two channels to transmit control commands to the CPUs of the reader unit 200 and printer unit 300. The asynchronous serial communication controller 127 is connected, through an I/O bus 128, to a scanner I/F 140 and printer I/F 145 serving as external I/F circuits.

A panel I/F 132 includes an I/F which is connected to an LCD controller 131 to do display on a liquid crystal screen on the operation unit 150 and a key input I/F 130 to input hard keys or touch panel keys.

The operation unit 150 has a liquid crystal display unit, a touch panel input device bonded onto the liquid crystal display unit, and a plurality of hard keys. A signal input through the touch panel or hard key is transmitted to the CPU 112 through the panel I/F 132. The liquid crystal display unit displays image data transmitted from the panel I/F 132. Image data or functions in the operation of the image forming apparatus 100 are displayed.

A real-time clock module 133 updates and saves the date and time managed in the device. The real-time clock module 133 is backed up by a backup battery 134.

An E-IDE connector 161 is used to connect an external memory device. In the first embodiment, the hard disk (HD) drive 160 is connected through the E-IDE connector 161 to store image data in a hard disk (HD) 162 or load image data from the hard disk 162.

Connectors 142 and 147 are connected to the reader unit 200 and printer unit 300, respectively. The connectors 142 and 147 include asynchronous serial I/Fs (143 and 148) and video I/Fs (144 and 149), respectively.

The scanner I/F 140 is connected to the reader unit 200 through the connector 142 and to the main controller 111 through a scanner bus 141. The scanner I/F 140 has a function of executing predetermined image processing for image data received from the reader unit 200. The scanner I/F 140 also has a function of outputting, to the scanner bus 141, a control signal generated on the basis of a video control signal transmitted from the reader unit 200.

Data transfer from the scanner bus 141 to the DRAM 116 is controlled by the bus controller 113.

The printer I/F 145 is connected to the printer unit 300 through the connector 147 and to the main controller 111 through a printer bus 146. The printer I/F 145 has a function of executing predetermined image processing for image data output from the main controller 111 and outputting the image data to the printer unit 300. The printer I/F 145 also has a function of outputting, to the printer bus 146, a control signal generated on the basis of a video control signal transmitted from the printer unit 300.

Transfer of raster image data bitmapped on the DRAM 116 to the printer unit 300 is controlled by the bus controller 113. The raster image data is DMA-transferred to the printer unit 300 through the printer bus 146 and video I/F 149.

Original electronic document search (to be described later) executed by the first image forming apparatus is done on the basis of a program described in, e.g., the ROM 114. More specifically, barcode information/digital watermark information as identification information (document ID) in image data (document image) received from the second image forming apparatus is interpreted by the graphic processor 135. Address information representing the storage location of an original electronic document corresponding to the document image is acquired. In accordance with the address information, the original electronic document stored in, e.g., the hard disk 162 is acquired.

<Description of Reader Image Processing Unit>

The detailed arrangement of a reader image processing unit arranged in the reader unit 200 will be described next with reference to FIG. 3.

Figure 3:
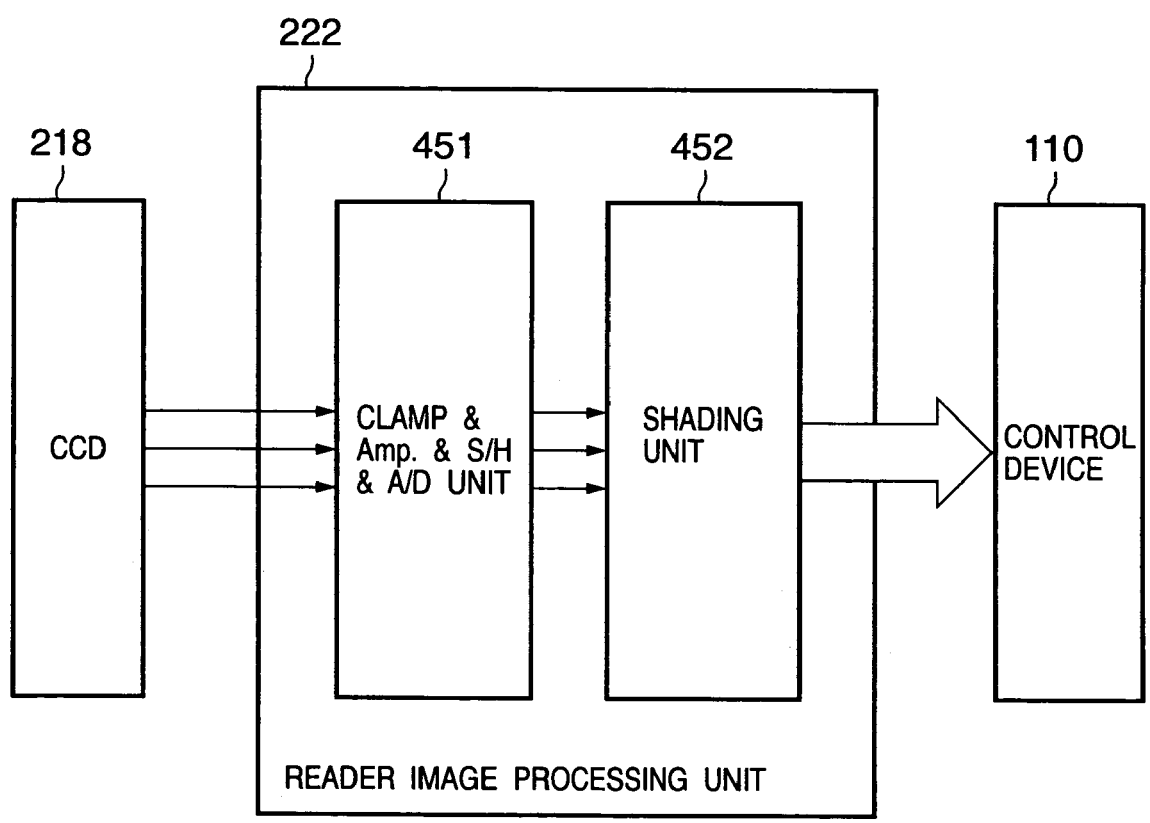
FIG. 3 is a block diagram showing the detailed arrangement of a reader image processing unit in a reader device according to the first embodiment of the present invention.

FIG. 3 is a block diagram showing the detailed arrangement of the reader image processing unit in the reader device according to the first embodiment of the present invention.

The arrangement of a reader image processing unit, 222 in the reader unit 200 is common to the image forming apparatuses 100 and 101, and the arrangement in one of them will be described below.

In the reader image processing unit 222, a document image is read by a CCD 218 and converted into an electrical signal (For a color sensor, the CCD 218 may be formed by laying out R, G, and B color filters in this order in-line on one line CCD. A 3-line CCD may be formed by laying out R, G, and B filters on the respective CCDs. The filters may be formed on chip or prepared independently of the CCD).

The electrical signal (analog image signal) is input to the reader image processing unit 222. A clamp & Amp. & S/H & A/D unit 451 samples and holds (S/H) the analog image signal, clamps its dark level to the reference potential, and amplifies the signal to a predetermined amount (the order of processing is not limited to this). The image signal is A/D-converted into, e.g., 8-bit R, G, and B digital signals. The R, G, and B signals are subjected to shading correction and black correction by a shading unit 452 and output to the control device 110.

<Description of Image Processing Unit of Scanner I/F>

The detailed arrangement of an image processing unit which executes image processing in the scanner I/F 140 will be described next with reference to FIG. 4.

Figure 4:
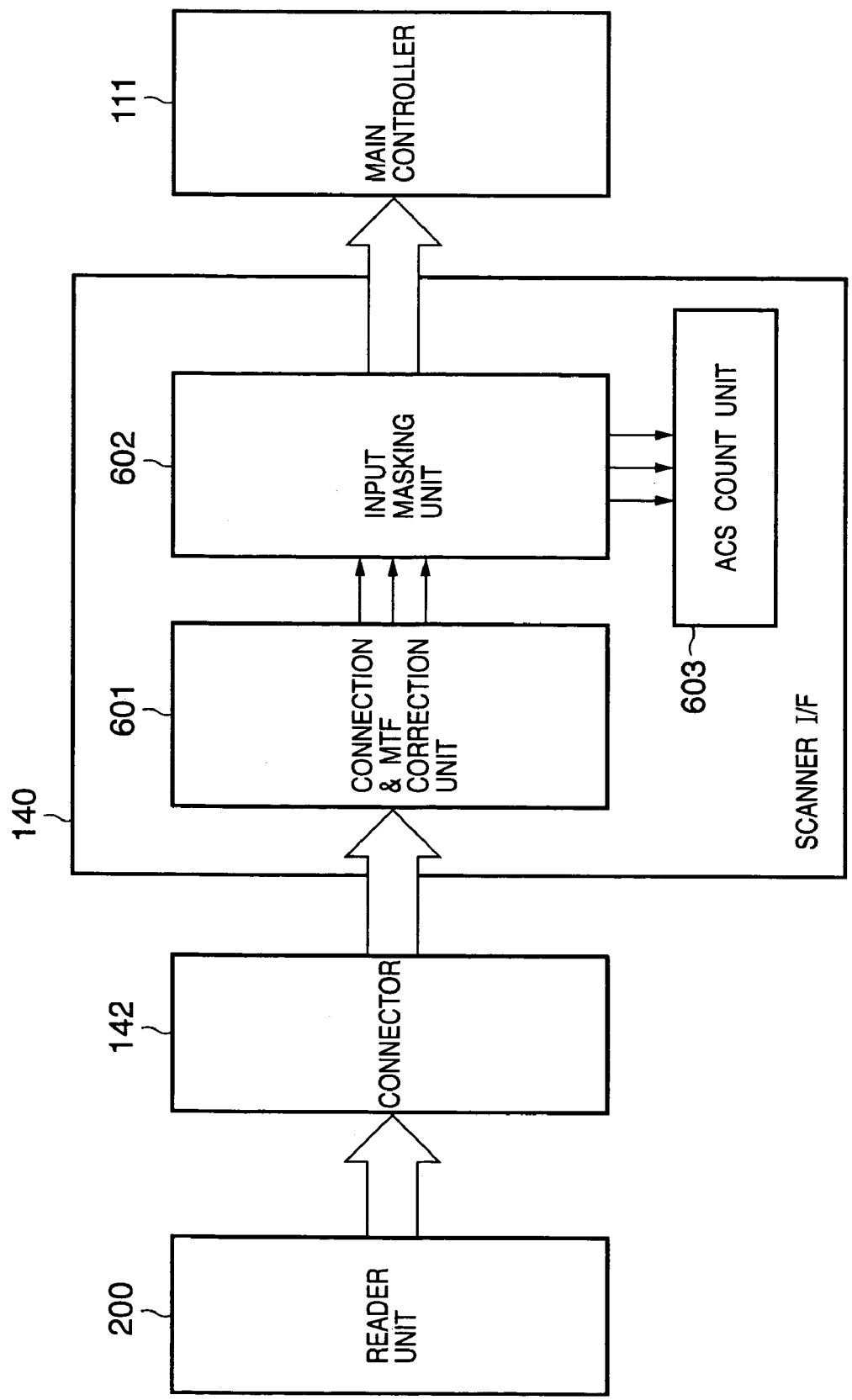
FIG. 4 is a block diagram showing the detailed arrangement of the image processing unit of a scanner I/F according to the first embodiment of the present invention.

FIG. 4 is a block diagram showing the detailed arrangement of the image processing unit of the scanner I/F according to the first embodiment of the present invention.

The arrangement of the image processing unit of the scanner I/F 140 is common to the image forming apparatuses 100 and 101, and the arrangement in one of them will be described below.

In the scanner I/F 140, a connection & MTF correction unit 601 corrects an image signal transmitted from the reader unit 200 through the connector 142. Especially, when the CCD 218 is a 3-line CCD, the read position changes between the lines. Hence, the delay amount is adjusted for each line in accordance with the read speed, and the signal timing is corrected such that the three lines have the same read position. In addition, since the MTF in reading changes depending on the read speed, the change is corrected by MTF correction.

The digital signal which has undergone read position timing correction is subjected to correction of the spectral characteristic of the CCD 218 and that of a lamp and mirror (not shown) by an input masking unit 602. The output from the input masking unit 602 is transmitted to an ACS count unit 603 and main controller 111.

<Description of Image Processing Unit of Printer I/F>

The detailed arrangement of an image processing unit which executes image processing in the printer I/F 145 will be described next with reference to FIG. 5.

FIG. 5 is a block diagram showing the detailed arrangement of the image processing unit of the printer I/F according to the first embodiment of the present invention.

The arrangement of the image processing unit of the printer I/F 145 is common to the image forming apparatuses 100 and 101, and the arrangement in one of them will be described below.

In the printer I/F 145, an image signal transmitted from the main controller 111 through the printer bus 146 is input to a LOG conversion unit 701. The LOG conversion unit 701 converts R, G, and B signals into C, M, and Y signals by LOG conversion. Next, a moire removing unit 702 removes moire. In a UCR & masking unit 703, UCR processing is executed to generate C, M, Y, and K signals from the C, M, and Y signals which have undertone moire removal, and masking processing is executed to correct them to signals suitable for printer output.

The signals processed by the UCR & masking unit 703 are subjected to density adjustment by a γ correction unit 704 and smoothing or edge processing by a filter unit 705. After these processing operations, the image is transmitted to the printer unit 300 through the connector 147.

<Description of Graphic Processor>

The detailed arrangement of the graphic processor 135 of the first image forming apparatus (image forming apparatus 100) will be described next with reference to FIG. 6A.

Figure 6A:
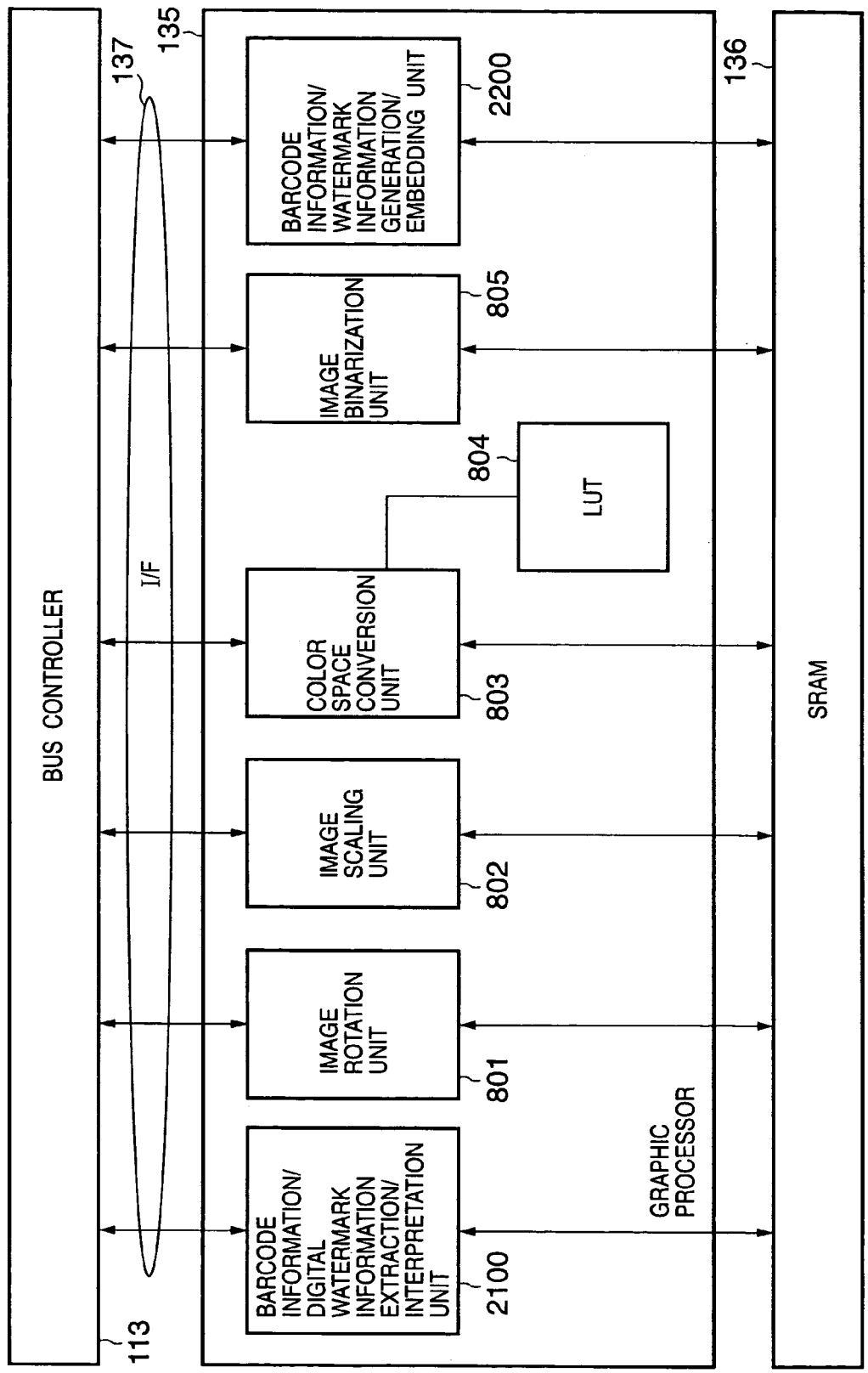
FIG. 6A is a block diagram showing the detailed arrangement of the graphic processor of a first image forming apparatus according to the first embodiment of the present invention.

FIG. 6A is a block diagram showing the detailed arrangement of the graphic processor of the first image forming apparatus according to the first embodiment of the present invention.

The graphic processor 135 executes image rotation/scaling or extraction/interpretation or generation/embedding of barcode information/digital watermark information according to the present invention.

More specifically, the graphic processor 135 executes various kinds of image processing such as image rotation by an image rotation unit 801, image scaling by an image scaling unit 802, color space conversion by a color space conversion unit 803 using an LUT 804, and image binarization by an image binarization unit 805.

An SRAM 136 is used as a temporary work area of the graphic processor 135. The graphic processor 135 is connected to the main controller 111 through an I/F 137. Data transfer between the graphic processor 135 and the DRAM 116 is done as DMA transfer and controlled by the bus controller 113.

The bus controller 113 executes control to set an image processing mode for the modules (801 to 805, 2100, and 2200) in the graphic processor 135 and timing control to transfer image data to each module.

The barcode information/digital watermark information extraction/interpretation unit 2100 extracts and interprets barcode information/digital watermark information contained in image data and acquires address information representing the storage location of an original electronic document.

The barcode information/watermark information generation/embedding unit 2200 generates address information or thumbnail image information of an original electronic document and embeds these pieces of information in the image data as barcode information/digital watermark information.

As barcode information, various kinds of barcodes such as a one-dimensional barcode and two-dimensional barcode can be used. Digital watermark information is implemented by embedding information by modulating a character string and, more particularly, the spacing between characters on an original electronic document or embedding information in a halftone image (thumbnail image) in an original electronic document.

The detailed arrangement of the graphic processor 135 of the second image forming apparatus (image forming apparatus 101) will be described next with reference to FIG. 6B.

Figure 6B:
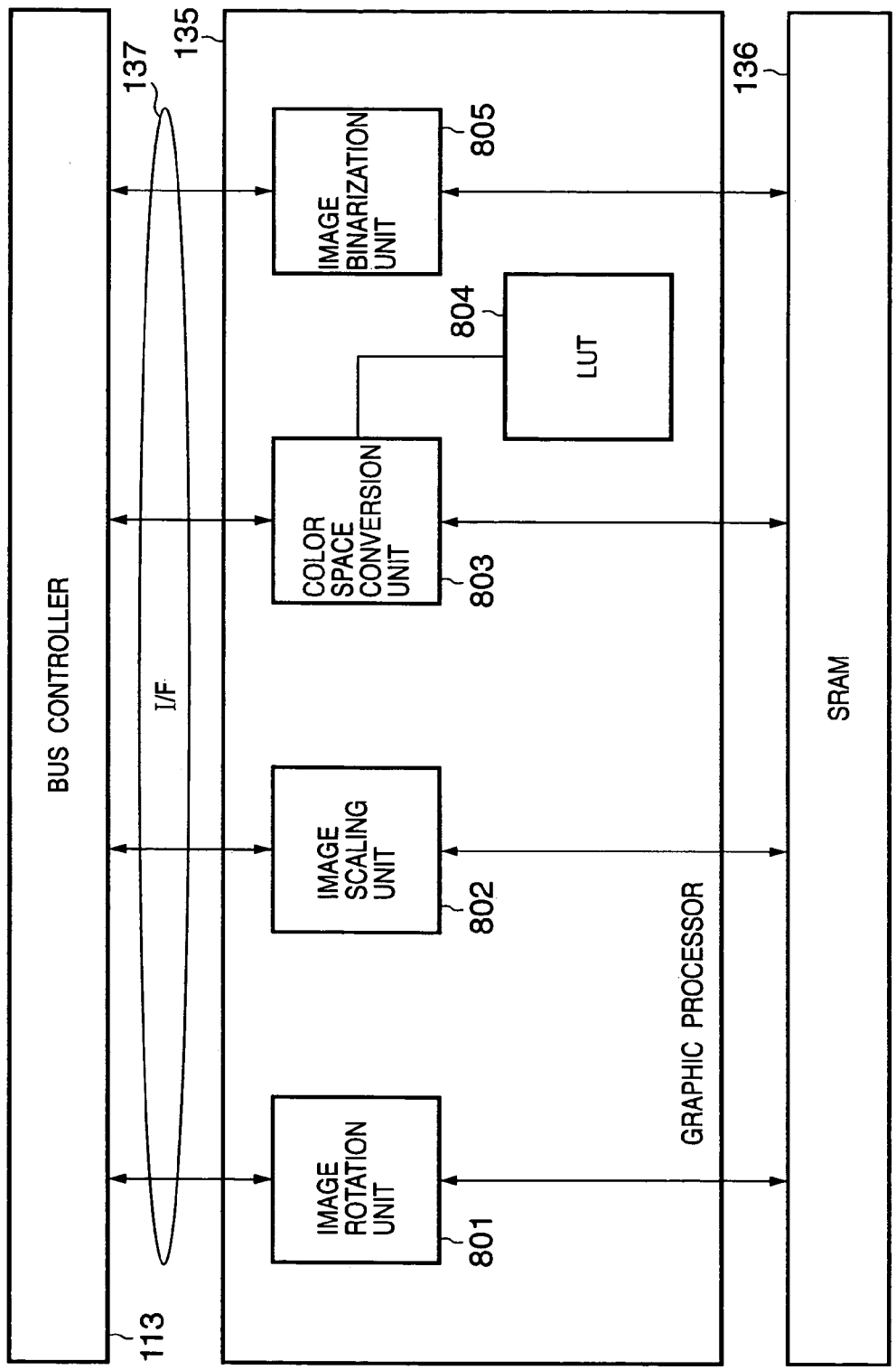
FIG. 6B is a block diagram showing the detailed arrangement of the graphic processor of a second image forming apparatus according to the first embodiment of the present invention.

FIG. 6B is a block diagram showing the detailed arrangement of the graphic processor of the second image forming apparatus according to the first embodiment of the present invention.

The arrangement shown in FIG. 6B does not have the functions of extracting/interpreting and generating/embedding barcode information/digital watermark information, unlike the arrangement shown in FIG. 6A. Only image processing such as image rotation/scaling is executed. That is, the arrangement shown in FIG. 6B does not have the barcode information/digital watermark information extraction/interpretation unit 2100 and barcode information/watermark information generation/embedding unit 2200, unlike the arrangement shown in FIG. 6A.

<Description of Storage Area>

Figure 7A:
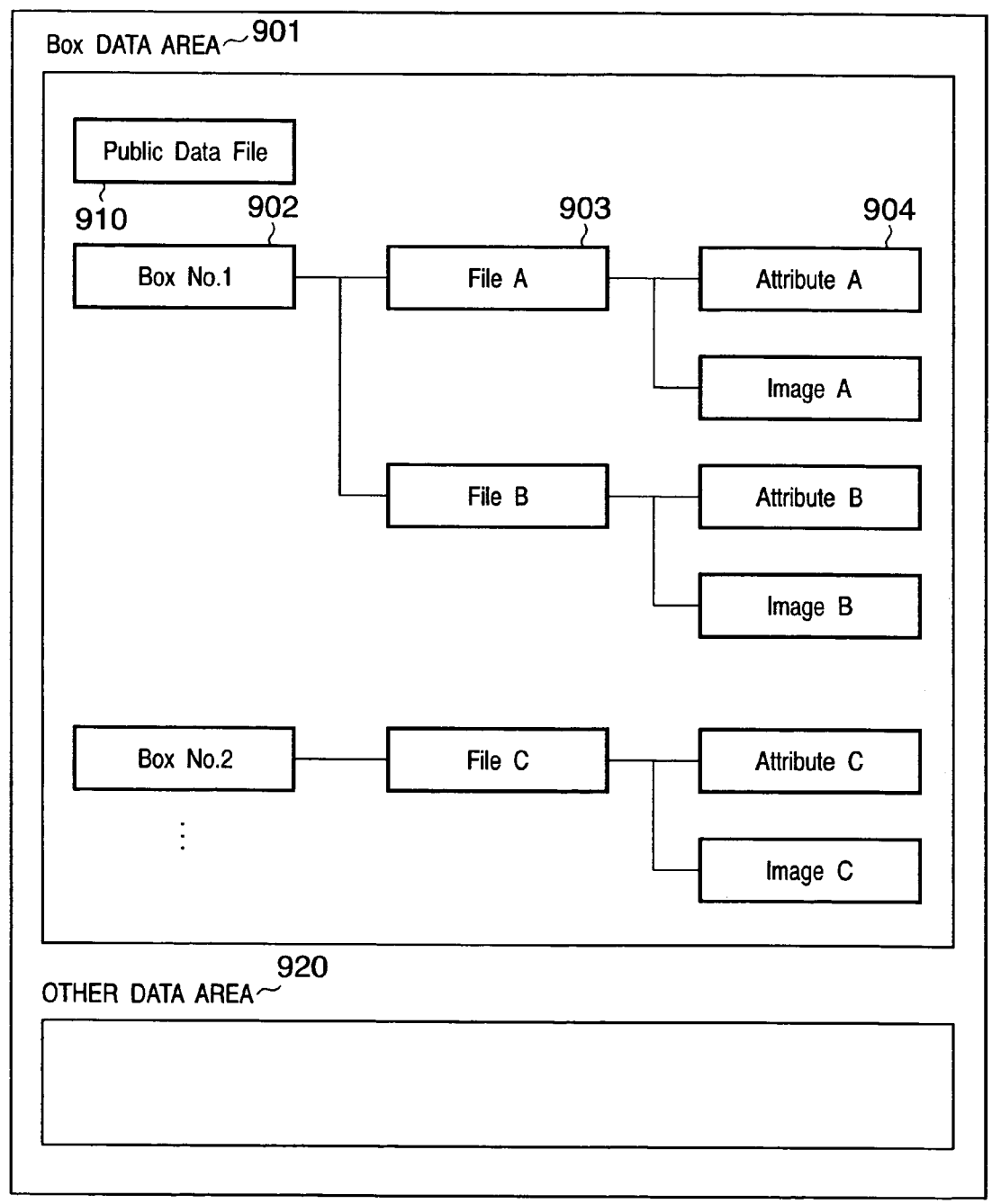
FIG. 7A is a view showing an example of the structure of a data storage area in a hard disk according to the first embodiment of the present invention.

The structure of a data storage area in the hard disk 162 will be described next with reference to FIGS. 7A and 7B.

Figure 7B:
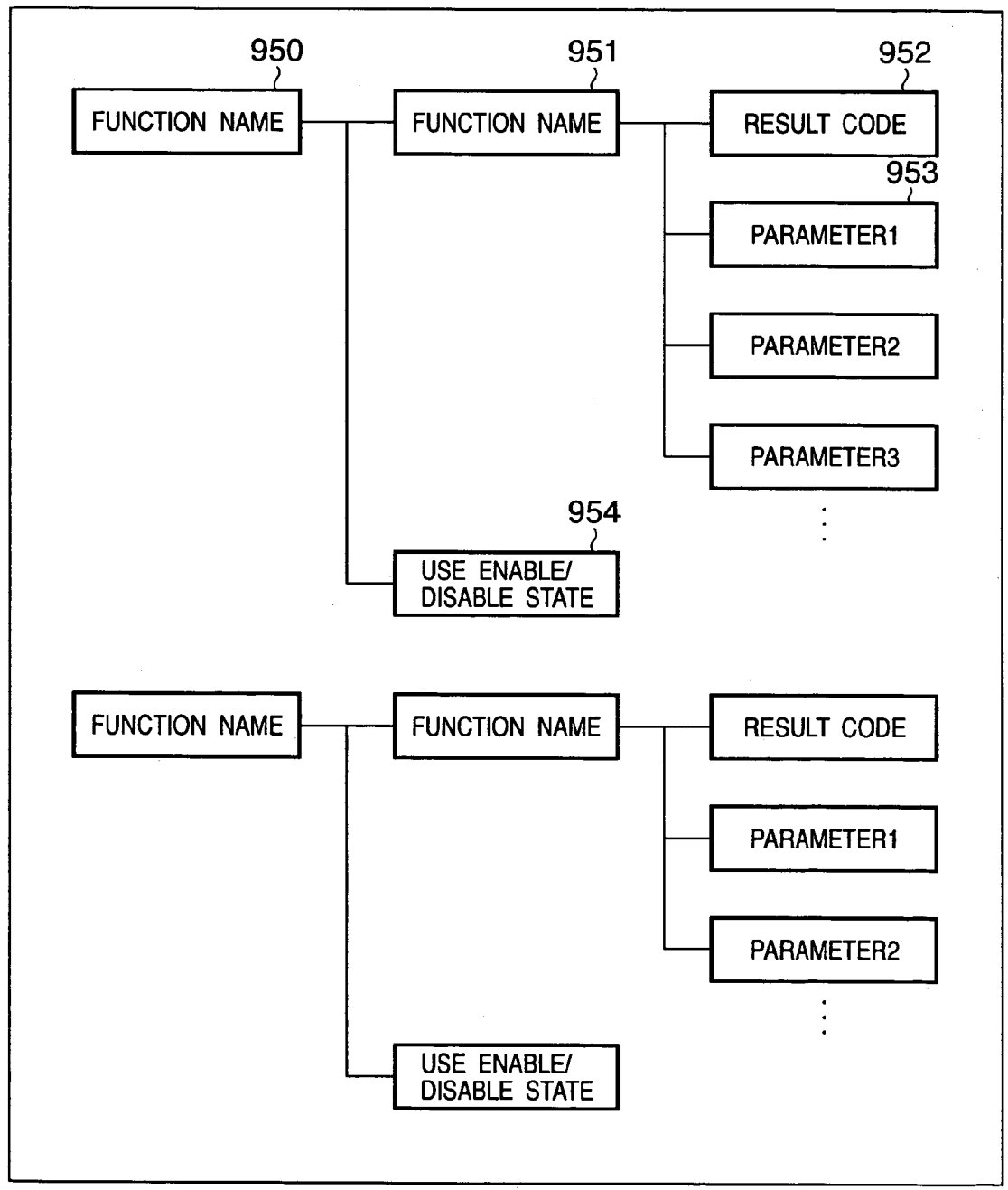
FIG. 7B is a view showing an example of a function data file according to the first embodiment of the present invention.

FIG. 7B is a view showing an example of the data storage area in the hard disk according to the first embodiment of the present invention.

Reference numeral 901 denotes a Box data area to store data, which is implemented by a document management function (Box function). An original electronic document is also stored in the Box data area 901. On the basis of a management unit called, e.g., Box, a plurality of original electronic documents can be stored in each Box.

Reference numeral 902 denotes data indicating a plurality of Boxes; 903, a data file in the Box; 904, an attribute (e.g., image, text, or photo) of the data file; 910, a function data file of information about a plurality of kinds of specific functions (use of the specific functions from another image forming apparatus is permitted) of the first image forming apparatus; and 920; a data storage area except data managed by the Box function.

The function data file 910 will be described next in detail with reference to FIG. 7B.

FIG. 7B is a view showing an example of the function data file according to the first embodiment of the present invention.

Reference numeral 950 denotes data indicating a public function name; 951, data in which a function name is described; and 952, a result code in the function, i.e., code data to be returned to the side (requester) using the function (service).

Reference numeral 953 denotes a parameter in the function; and 954, a flag representing the use enable/disable state of the function. If the flag 954 is not valid, the function cannot be used.

<Description of Operation Unit>

A basic window displayed on the display unit of the operation unit 150 will be described next with reference to FIG. 8.

Figure 8:
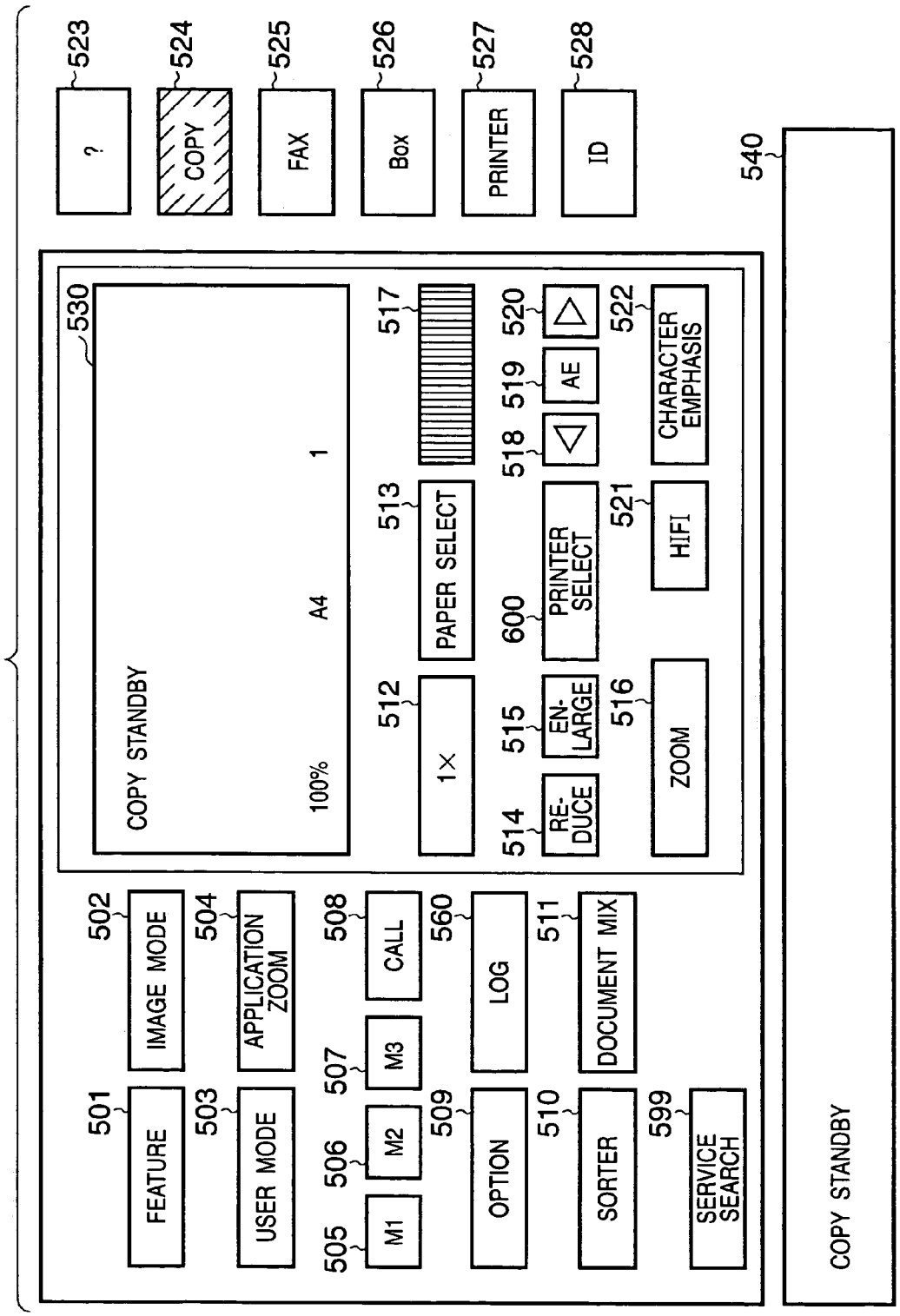
FIG. 8 is a view showing an example of a basic window displayed on the display unit of an operation unit according to the first embodiment of the present invention.

FIG. 8 is a view showing an example of the basic window displayed on the display unit of the operation unit according to the first embodiment of the present invention.

As described above, the operation unit 150 is a touch panel, When the user touches the frame of a displayed function, the function is executed.

A copy mode key 524 is pressed to execute a copy operation. When the copy mode key 524 is pressed, a copy mode window is displayed in a display region 530.

When a feature key 501 is pressed, a mode to set double-side copy, multiple copy, movement, binding margin, or frame erase is set.

A status line 540 displays a message indicating the status of the device or print information. In the example shown in FIG. 8, the status line 540 indicates that a copy standby mode is set.

When an image mode key 502 is pressed, a mode to set halftone, shading, trimming, or masking for a copy image is set. When a user mode key 503 is set, a mode to set mode memory registration or a standard mode window is set. When an application zoom key 504 is pressed, a mode to independently scale a document in the X and Y directions or a zoom program mode to calculate the scaling ratio from the document size and copy size is set.

An M1 key 505, M2 key 506, and M3 key 507 are pressed to invoke the mode memories registered in the respective keys. A call key 508 is pressed to invoke mode setting for an immediately preceding job and set the mode again.

An option key 509 is pressed to set optional functions such as a film projector to directly copy a film. A sorter key 510 is pressed to set sorting/non-sorting or grouping. A document mix key 511 is pressed to set documents in A4 and A3 sizes or B4 and B4 sizes together.

A 1× key 512 is pressed to set the copy magnification to 100%. A reduce key 514 or enlarge key 515 is pressed to reduce or enlarge a standard size. A zoom key 516 is pressed to designate a desired scaling ratio. A paper select key 513 is pressed to select a copy paper sheet. Every time a density key 518 is pressed, the copy density increases. Every time a density key 520 is pressed, the copy density decreases.

When the density key 518 or 520 is pressed, the indicator on a density indicator region 517 moves to the left or right to indicate the current density state. An AE key 519 is pressed to automatically adjust the density of a document such as newspaper with a dark background. An HIFI key 521 is pressed to copy a document such as a photo document having halftone with a high density.

A character emphasis key 522 is pressed to emphasize characters in copying a character document. A log key 560 is pressed to display the log information of printed jobs. Pieces of information containing, e.g., the end time, user name, file name, and number of printed pages of a print job are displayed. A printer select key 600 is pressed to select the receiving-side copying machine in remote copy or networked copy.

A guide key 523 is pressed to know the function of a key, i.e., display the explanation of a key. A fax key 525 is pressed to send documents or images. A Box key 526 is pressed to display the Box function. A printer key 527 is pressed to change the density of the printer or refer to the detailed print output information of PDL data from the remote host computer. An ID key 528 is pressed to authenticate the user who uses the image forming apparatus.

A service search key 599 is pressed to search for a function (service) which is made public in another image forming apparatus connected to the LAN 400. When the service search key 599 is pressed, a service search result window shown in FIG. 9A or 9B is displayed.

The service search result window will be described with reference to FIGS. 9A and 9B.

FIGS. 9A and 9B are views showing examples of the service search result window according to the first embodiment of the present invention.

Referring to FIGS. 9A and 9B, a selected key is displayed with hatching. Instead of hatching, any other display form such as color-coding or blinking may be used. Any display form to make the operator distinguish between selected information and an unselected state can be used.

When a search execute key 1105 is pressed in the service search result window, a target (e.g., image forming apparatus 100) which has made a function (service) public and the contents of the function (service) can be searched for.

When the search execute key 1105 is pressed, target names (e.g., network user names) are displayed in a display field 1101. The IP addresses of the targets are displayed in a display field 1102. The service contents are displayed in a display field 1103. The use enable/disable states (OK/NG) of the services are displayed in a display field 1104.

When one of the display fields is pressed, the function (service) is selected. The selection is determined by an OK key 1106. When a cancel key 1107 is pressed, service search itself is canceled, and the window returns to the basic window shown in FIG. 8.

In the first embodiment, for example, the original data search service of "target01" in the display field 1101 is selected. When the OK key 1106 is pressed, an original data search service execution window shown in FIG. 10 is displayed.

The original data search service execution window will be described with reference to FIG. 10.

FIG. 10 is a view showing an example of the original data search service execution window according to the first embodiment of the present invention.

FIG. 10 shows an operation example for the operation unit 150 of the second image forming apparatus (image forming apparatus 101).

Referring to FIG. 10, a target name is displayed in a display field 1201. The IP address of the target is displayed in a display field 1202. The service contents are displayed in a display field 1203. The use enable/disable state (OK/NG) of the service is displayed in a display field 1204.

A document (with a document ID) to be processed, which serves as a search condition to search for original data, is placed on the document table or ADF. When a start key 1205 is pressed, scan starts. The image data is transmitted to the first image forming apparatus (image forming apparatus 100). When a cancel key 1206 is pressed, the function itself is canceled, and the window returns to the service search result window shown in FIG. 9A.

When the start key 1205 is pressed in the second image forming apparatus (image forming apparatus 101), scan starts. The image data is transmitted to the first image forming apparatus (image forming apparatus 100). After that, in the first image forming apparatus, original data (original electronic document) corresponding to address information contained in the received image data is searched for.

Figure 11:
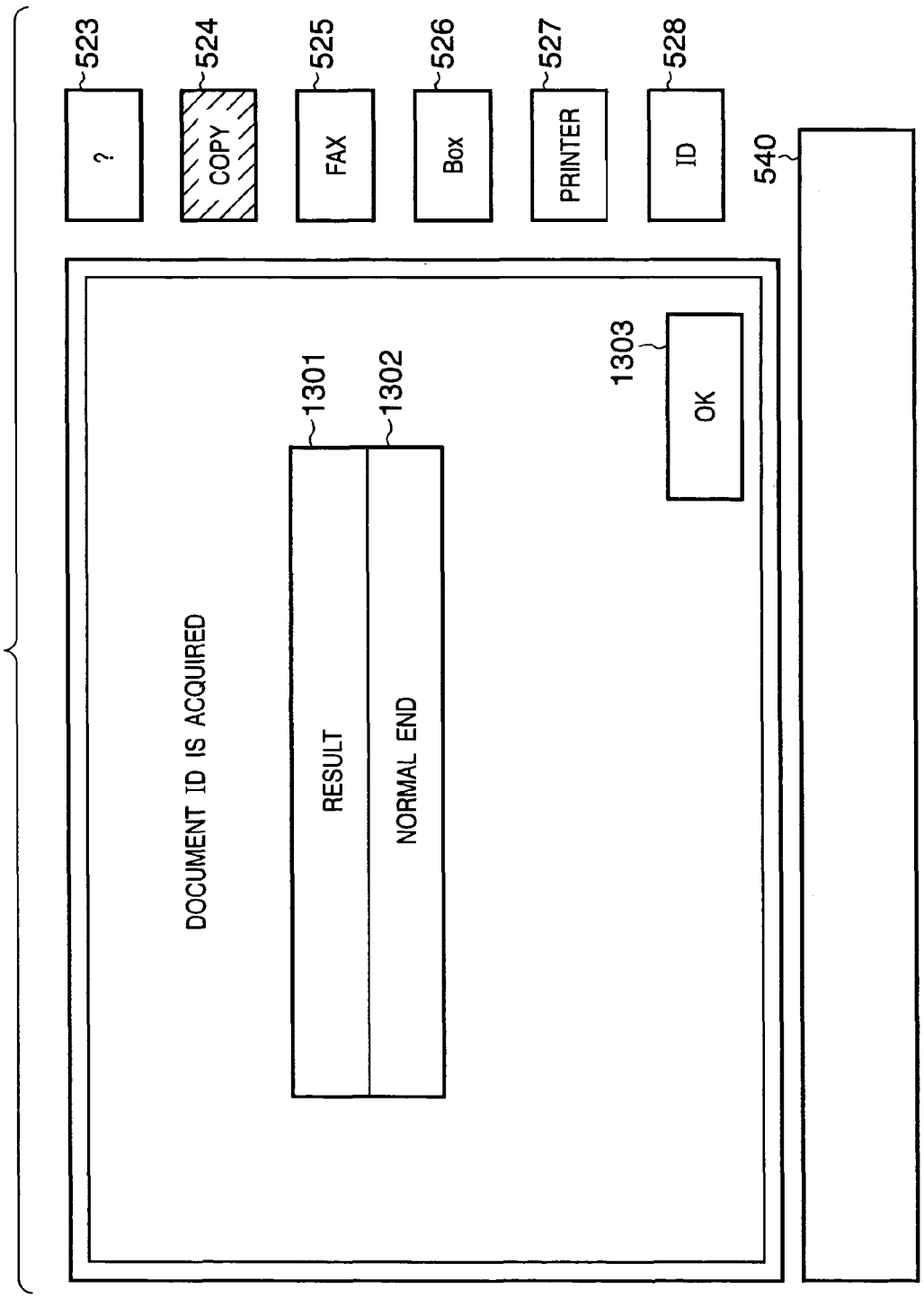
FIG. 11 is a view showing an example of a search result window according to the first embodiment of the present invention.

When the original data is found, a document ID indicating the original data is transmitted from the first image forming apparatus to the second image forming apparatus. With this operation, the second image forming apparatus can acquire the document ID corresponding to the read document. In this case, a search result window shown in FIG. 11 is displayed as the search result. The acquired document ID is stored in, e.g., the hard disk 160.

The search result window will be described with reference to FIG. 11.

FIG. 11 is a view showing an example of the search result window according to the first embodiment of the present invention.

Referring to FIG. 11, "result" is displayed in a display field 1301. The result (normal end/abnormal end) of acquisition is displayed in a display field 1302. In the first embodiment, the operation is normally ended. In this case, for example, "normal end" is displayed in the display field 1302. When an OK key 1303 is pressed, the window returns to the basic window shown in FIG. 8.

When the second image forming apparatus has acquired the document ID, various kinds of specific functions (e.g., data transmission function or facsimile transmission function) by the document ID in the first image forming apparatus can also be used on the basis of the document ID.

Referring to FIG. 9B, the original data print service of "target98" in the display field 1101 is selected. When the OK key 1106 is pressed, an original data print service execution window is displayed. The original data print service execution window will be described with reference to FIG. 12.

Figure 12:
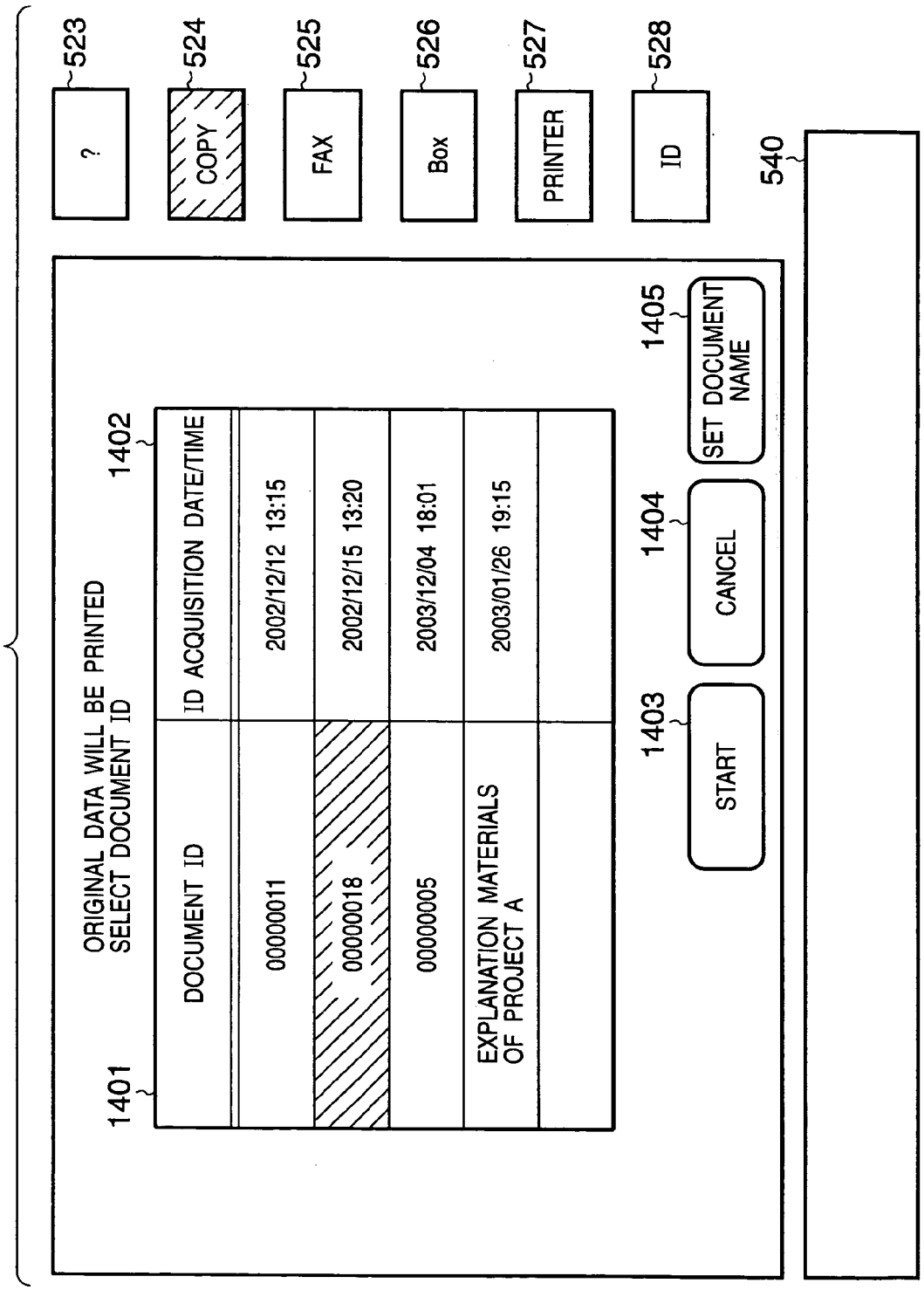
FIG. 12 is a view showing an example of an original data print service execution window according to the first embodiment of the present invention.

FIG. 12 is a view showing an example of the original data print service execution window according to the first embodiment of the present invention.

The original data print service execution window is generated on the basis of document IDs and their acquisition dates/times, which are stored in, e.g., the HD drive 160.

Referring to FIG. 12, document IDs are displayed in a display field 1401. The acquisition dates/times of the document IDs are displayed in a display field 1402. When a document ID (00000018) to be printed is selected, and a start key 1403 is pressed, printing starts.

To cancel document ID selection, a cancel key 1404 is pressed. Then, the window returns to the service search result window shown in FIG. 9B.

When a document name set key 1405 is pressed, the document ID can be changed to a desired (arbitrary) document name. In this case, instead of changing the document ID itself, only an alias is set (i.e., the alias document ID is used to search for the original data).

When the document ID is selected, and the start key 1403 is pressed in this state, the second image forming apparatus acquires original data corresponding to the document ID from the first image forming apparatus and executes printing of the original data. When printing of the original data is ended, a print result window shown in FIG. 13 is displayed.

The print result window will be described with reference to FIG. 13.

Figure 13:
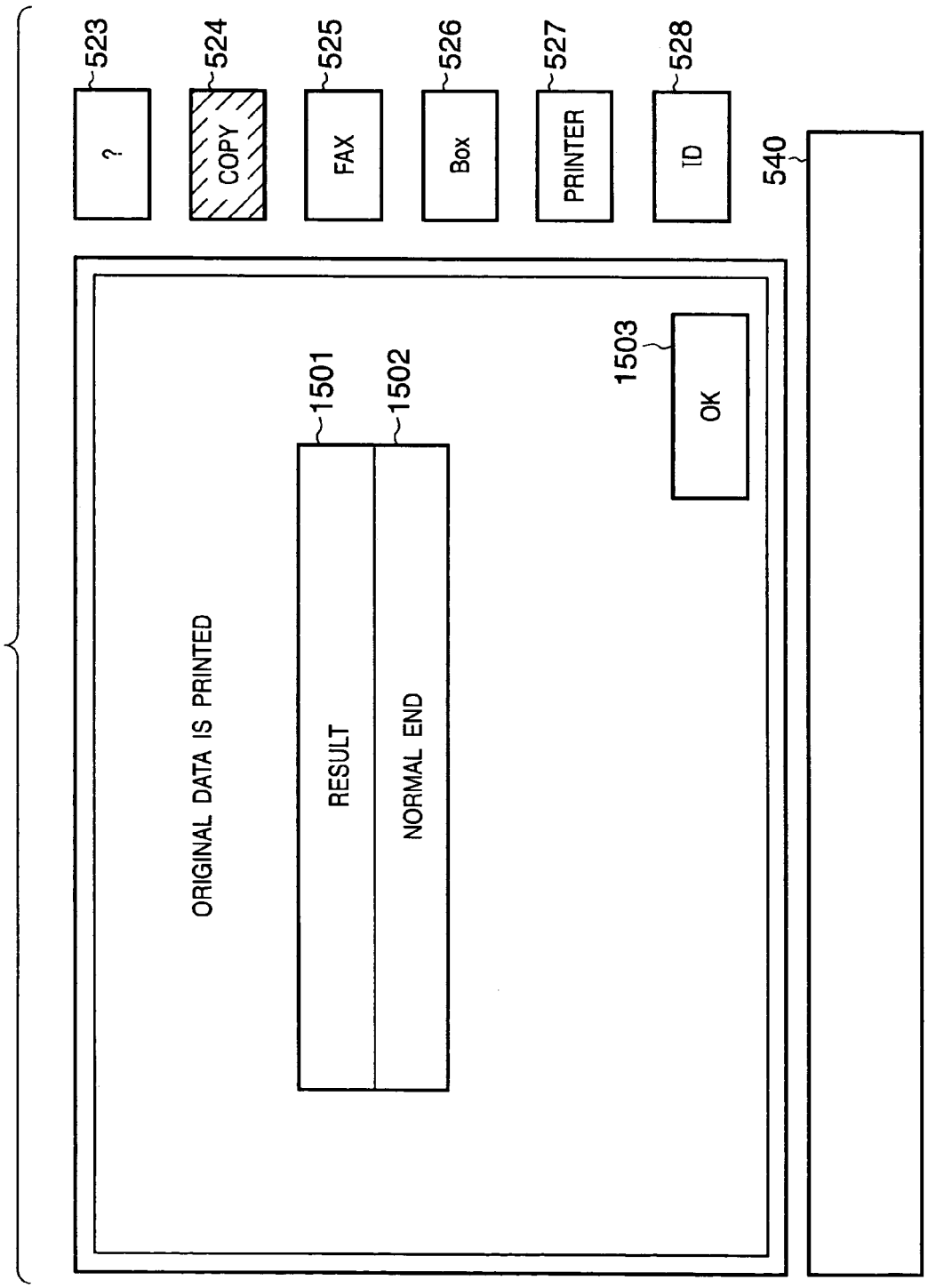
FIG. 13 is a view showing an example of a print result window according to the first embodiment of the present invention.

FIG. 13 is a view showing an example of the print result window according to the first embodiment of the present invention.

Referring to FIG. 13, "result" is displayed in a display field 1501. The result (normal end/abnormal end) of acquisition is displayed in a display field 1502. In the first embodiment, the operation is normally ended. In this case, for example, "normal end" is displayed in the display field 1502. When an OK key 1503 is pressed, the window returns to the basic window shown in FIG. 8.

The processing executed by the image forming apparatus according to the first embodiment will be described next with reference to FIG. 14.

Figure 14:
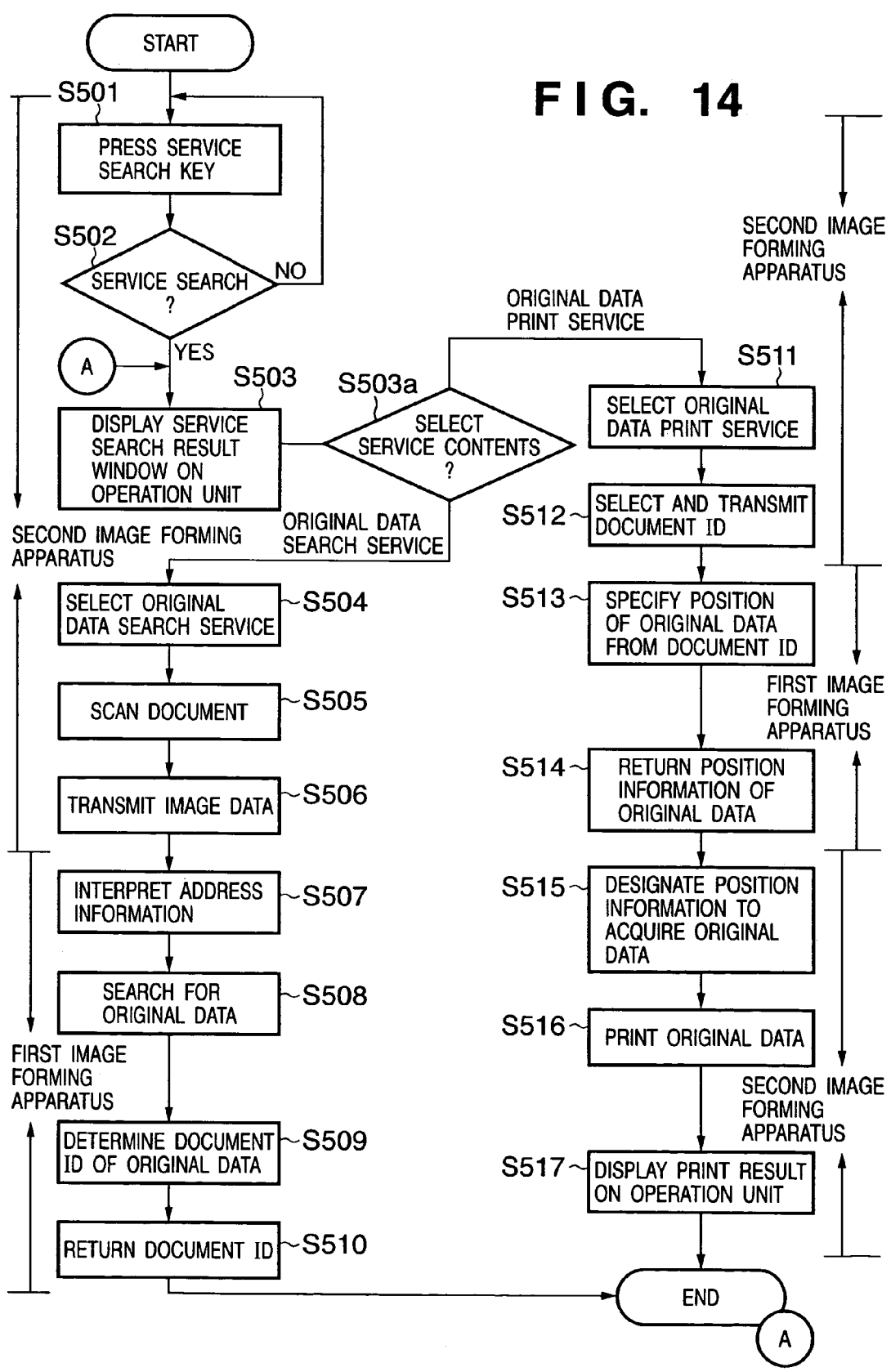
FIG. 14 is a flowchart showing processing executed by the image forming apparatus according to the first embodiment of the present invention.

FIG. 14 is a flowchart showing processing executed by the image forming apparatus according to the first embodiment of the present invention.

FIG. 14 especially shows processing after the service search key 599 is pressed in the basic window in FIG. 8, which is displayed on the operation unit 150 of the second image forming apparatus (image forming apparatus 101).

In this service search, a search request (function information acquisition request) is broadcast to image forming apparatuses on the LAN. Upon receiving the search request, each image forming apparatus returns a function (service) data file to the image forming apparatus as the search request source.

When the service search key 599 is pressed in step 501, the function (service) of each image forming apparatus connected to the LAN 400 is searched for. In step S502, it is determined whether an appropriate service is found. If no service is found (NO in step S502), the flow returns to step S501. If the service is found (YES in step S502), i.e., a function data file is received, the flow advances to step S503.

In step S503, on the basis of the function data file, for example, the service search result window shown in FIG. 9A is displayed on the operation unit 150. In step S503a, it is determined whether service contents are selected in the service search result window.

If the original data search service is selected in step S503a, the flow advances to step S504 to determine selection of the original data search service. In step S505, the original data search service execution window shown in FIG. 10 is displayed on the operation unit 150. Scan of a document which is placed on the document feed unit 250 and serves as a search condition is started. In step S506, image data obtained by scan is transmitted to the first image forming apparatus (image forming apparatus 100).

In step S507, in the first image forming apparatus, the address information of original data, which is obtained from the barcode information or digital watermark information in the image data, is interpreted. In step S508, original data corresponding to the address information is searched for from the hard disk 160 on the basis of the interpreted address information. When the original data is found, a document ID indicating the position (storage location) of the original data is determined in step S509. In the first embodiment, for example, an 8-digit number is used.

In step S510, the first image forming apparatus serving as the provider of the service returns the document ID to the second image forming apparatus serving as the requester of the service. Accordingly, the search result window shown in FIG. 11 is displayed on the operation unit 150. The received document ID is stored in the hard disk 160 of the second image forming apparatus.

The original data search service itself is ended here. However, when the flow returns to A in FIG. 14, an arbitrary service can be selected again in step S503 from the service search result window shown in FIG. 9A. For example, the original data search service may be executed again.

If the original data print service is selected in step S503a, the flow advances to step S511 to determine selection of the original data print service. In step S512, the original data print service execution window shown in FIG. 12 is displayed on the operation unit 150. The document ID of original data to be printed is selected and transmitted from the second image forming apparatus serving as the requester to the first image forming apparatus.

In step S513, the first image forming apparatus specifies the position information (storage location (address information)) of the original data from the received document ID. In step S514, the original data position information is returned to the second image forming apparatus serving as the requester.

In step S515, the second image forming apparatus designates the original data position information and acquires the original data from the first image forming apparatus. In step S516, the acquired original data is printed. In step S517, the print result window shown in FIG. 13 is displayed on the operation unit 150.

The original data print service itself is ended here. However, when flow returns to A in FIG. 14, an arbitrary service can be selected again in step S503 from the service search result window shown in FIG. 9A. For example, original data print of the same data or another data can be executed in the original data print service in step S511.

In the above-described example, the original data search service and original data print service have been described. The functions (services) the first image forming apparatus can made public also include a Box function, facsimile transmission function, and data transmission function (e.g., e-mail transmission which transmits e-mail and original data attached to it). Even for these functions, processing for desired original data can be executed by appropriately using an operation window corresponding to the function to be used, as in the above-described example.

For example, to use the original data facsimile service, the document ID of original data to be transmitted and the facsimile number of the transmission destination are designated so that facsimile transmission can be implemented. To use the Box saving service, the document ID of original data to be saved and the saving destination (address information such as the full path information of a shared folder which is made public in the server on the LAN) are designated so that data saving can be implemented.

As described above, according to the first embodiment, the first image forming apparatus having a specific function makes the function public to allow the second image forming apparatus on the network to use it. Especially the second image forming apparatus or device without the specific function can use various kinds of functions prepared in the first image forming apparatus having the specific function without adding any device arrangement.

The second image forming apparatus can easily use the existing first image forming apparatus having the specific function without introducing a new first image forming apparatus having the specific function. Hence, the convenience for the user can be increased. In addition, the conventional introduction cost can be reduced because no new first image forming apparatus having the specific function need be introduced.

The function (service) of acquiring a document ID from the image data of a read document and the function (service) of acquiring original data from a document ID are separated. With this arrangement, the convenience on the user side who uses the function (service) can be increased because he/she can use only the former function (service) or only the latter function (service) or can combine them.

Document IDs acquired in the past are saved in the second image forming apparatus. The document IDs can be read out any time in executing a function. For this reason, if original data has been used in the past, its document ID need not be acquired by reading the document corresponding to the original data again and transmitting the read image to the first image forming apparatus. Instead, various kinds of processing for the original data corresponding to a desired document ID can quickly be executed any time by using the document ID again.

Second Embodiment

In the second embodiment, in addition to the arrangement of the first embodiment, the thumbnail image of original data is stored in a hard disk 160 of the first image forming apparatus. The thumbnail image is provided to the second image forming apparatus together with the document ID of the original data. In the second image forming apparatus, the contents of original data can be confirmed before various kinds of processing for the original data are executed.

<Description of Operation Unit>

Figure 15:
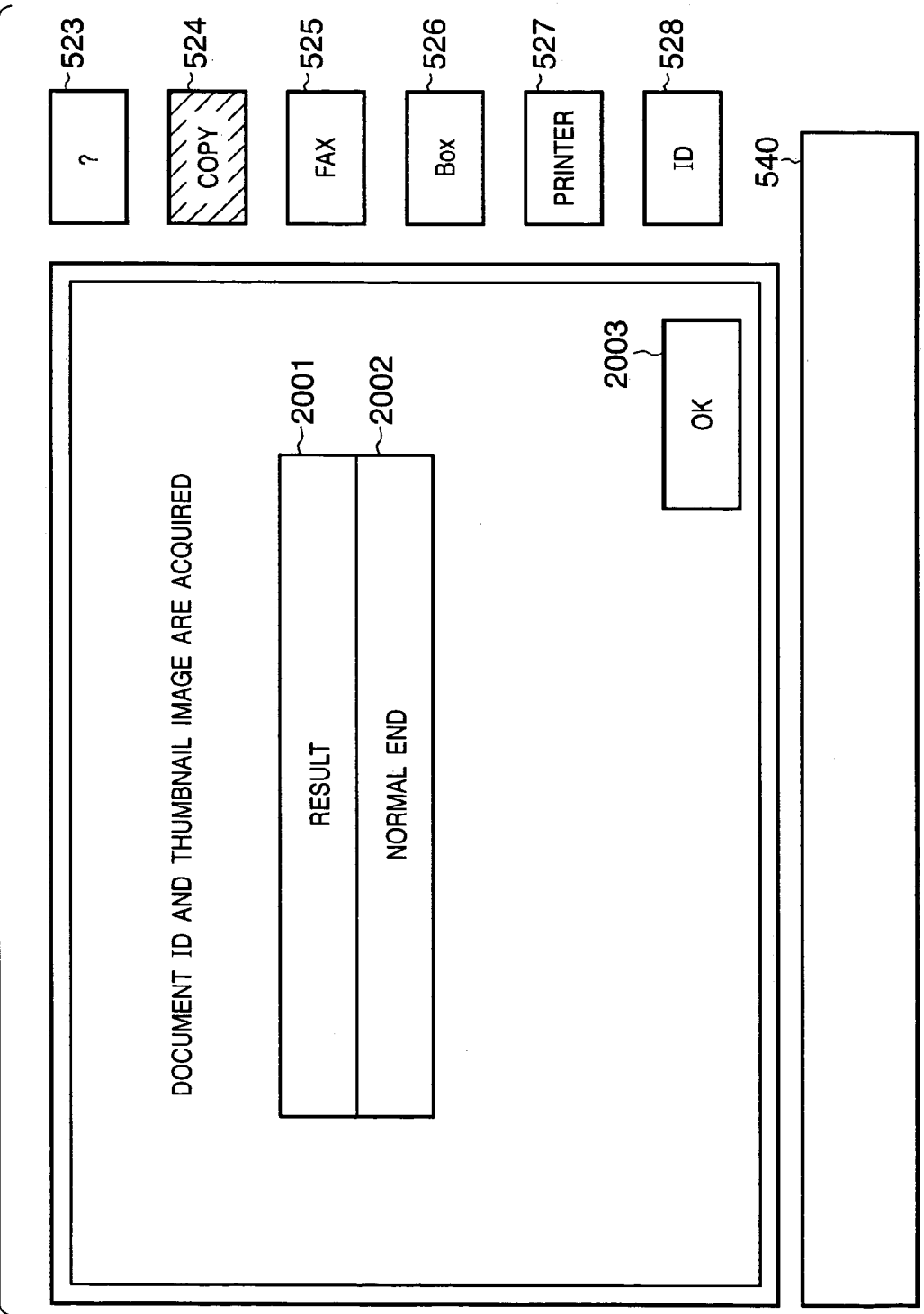
FIG. 15 is a view showing an example of a search result window according to the second embodiment of the present invention.

On the original data search service execution window shown in FIG. 10, when the image data of a document is transmitted, and the document ID and thumbnail image of original data corresponding to the document are acquired, a search result window shown in FIG. 15 is displayed.

The search result window will be described with reference to FIG. 15.

FIG. 15 is a view showing an example of the search result window according to the second embodiment of the present invention.

Referring to FIG. 15, "result" is displayed in a display field 2001. The result (normal end/abnormal end) of acquisition is displayed in a display field 2002. In the second embodiment, the operation is normally ended. In this case, for example, "normal end" is displayed in the display field 2002. When an OK key 2003 is pressed, the window returns to the basic window shown in FIG. 8.

Referring to FIG. 9B, the original data print service of "target98" in a display field 1101 is selected. When an OK key 1106 is pressed, an original data print service execution window is displayed. The original data print service execution window will be described with reference to FIG. 16.

Figure 16:
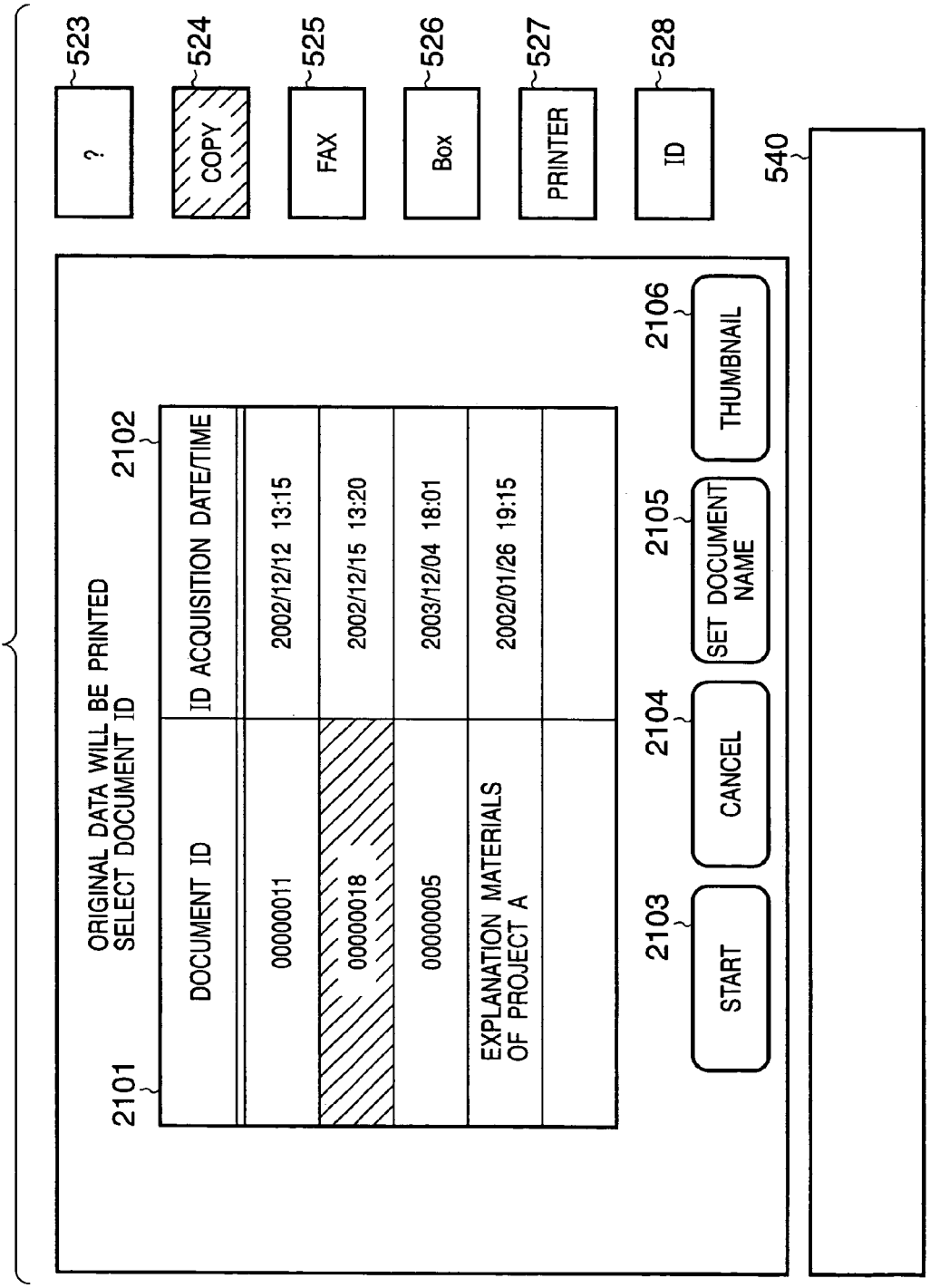
FIG. 16 is a view showing an example of an original data print service execution window according to the second embodiment of the present invention.

FIG. 16 is a view showing an example of the original data print service execution window according to the second embodiment of the present invention.

Referring to FIG. 16, document IDs are displayed in a display field 2101. The acquisition dates/times of the document IDs are displayed in a display field 2102. When a document ID (00000018) to be printed is selected, and a start key 2103 is pressed, printing starts.

To cancel document ID selection, a cancel key 2104 is pressed. Then, the window returns to the service search result window shown in FIG. 9B.

When a document name set key 2105 is pressed, the document ID can be changed to a desired (arbitrary) document name. In this case, instead of changing the document ID itself, only an alias is set (i.e., the alias document ID is used to search for the original data).

Figure 17:
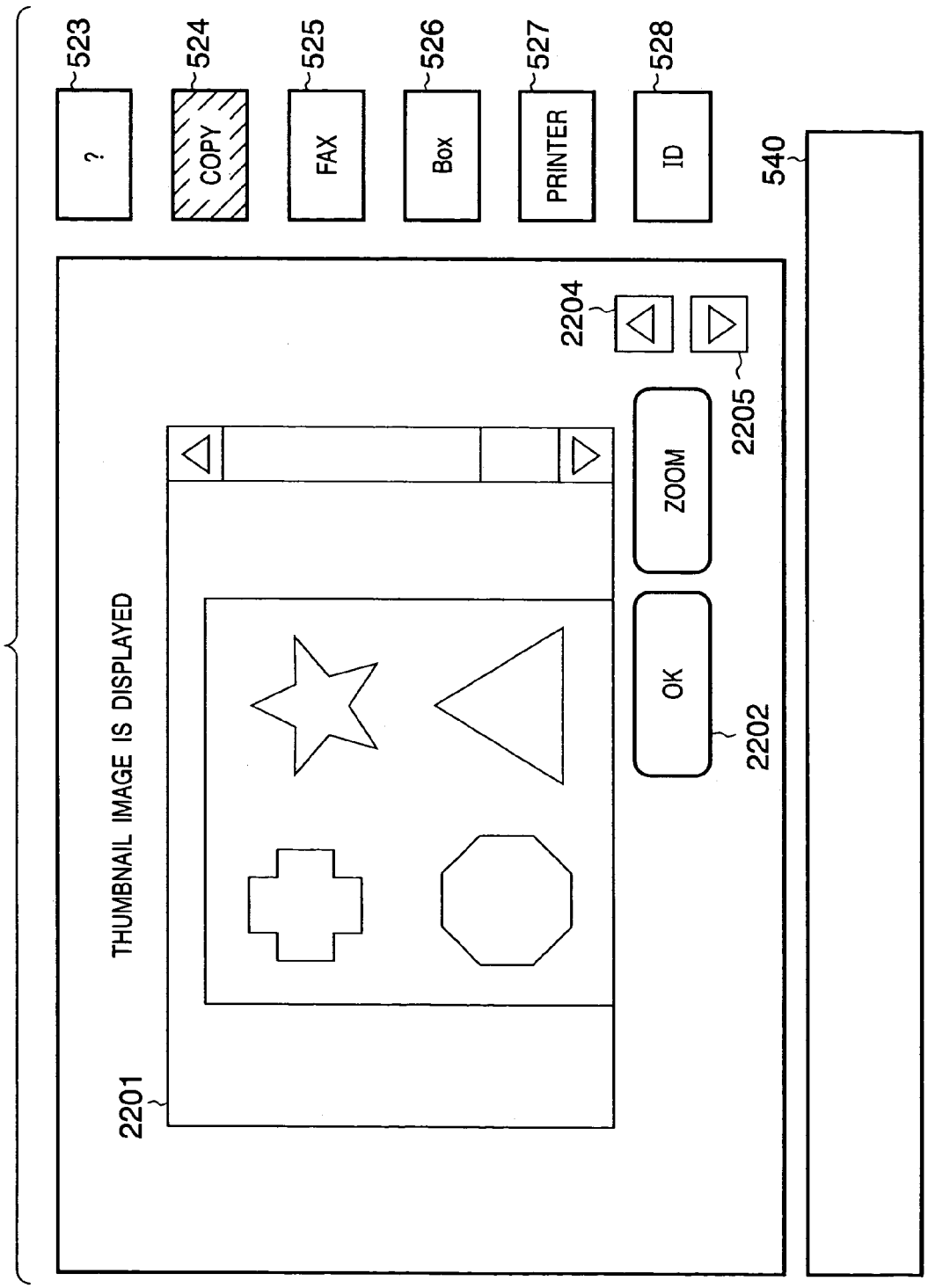
FIG. 17 is a view showing an example of a thumbnail image display window according to the second embodiment of the present invention.

When the document ID is selected, and a thumbnail display key 2106 is pressed in this state, for example, the thumbnail image display window of original data corresponding to the document ID is displayed in FIG. 17.

The thumbnail image display window will be described with reference to FIG. 17.

FIG. 17 is a view showing an example of the thumbnail image display window according to the second embodiment of the present invention.

Referring to FIG. 17, reference numeral 2201 denotes an actual thumbnail image display region. If the thumbnail image cannot wholly be displayed in the display region, the region can be scrolled vertically by using scroll buttons. When an OK key 2202 is pressed, the window returns to the original data print service execution window shown in FIG. 16.

Reference numerals 2204 and 2205 denote zoom keys. When the up key 2204 is pressed, the thumbnail image in the display region 2201 is displayed large. When the down key 2205 is pressed, the thumbnail image in the display region 2201 is displayed small.

The processing executed by the image forming apparatus according to the second embodiment will be described next with reference to FIG. 18.

Figure 18:
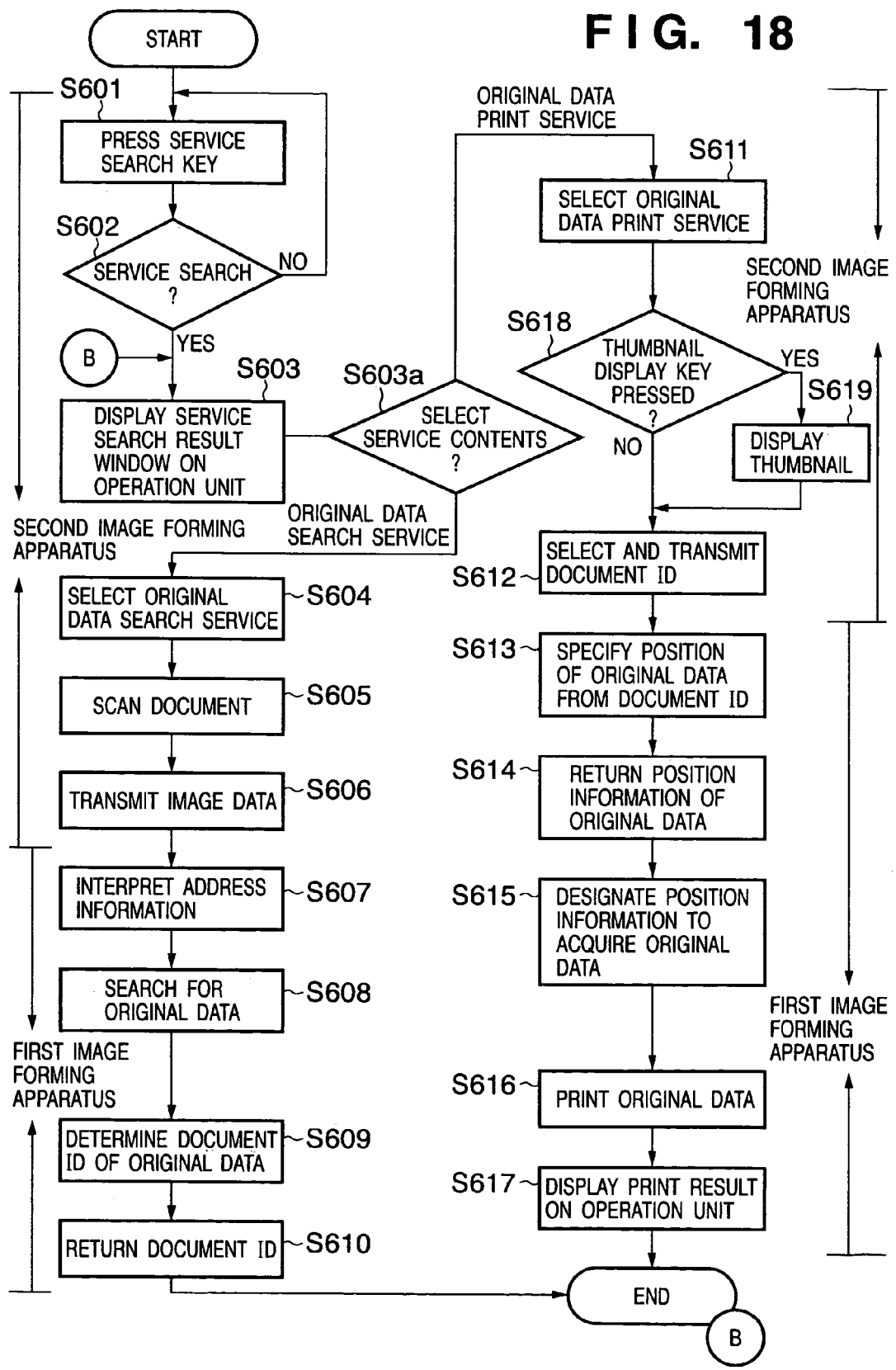
FIG. 18 is a flowchart showing processing executed by an image forming apparatus according to the second embodiment of the present invention.

FIG. 18 is a flowchart showing processing executed by the image forming apparatus according to the second embodiment of the present invention.

FIG. 18 especially shows processing after a service search key 599 is pressed in the basic window in FIG. 8, which is displayed on an operation unit 150 of the second image forming apparatus (image forming apparatus 101).

Steps S601 to S607 in the flowchart in FIG. 18 correspond to steps S501 to S507 in FIG. 14, and a detailed description thereof will be omitted. Especially in FIG. 18, steps S618 and S619 are added to the flowchart in FIG. 14.

Referring to FIG. 18, when selection of the original data print service is determined in step S611, the original data print service execution window shown in FIG. 16 is displayed on the operation unit 150. It is determined in step S618 whether the thumbnail display key 2106 is pressed. If the thumbnail display key 2106 is not pressed (NO in step S618), the flow advances to step S612. If the thumbnail display key 2106 is pressed (YES in step S618), the flow advances to step S619.

In step S619, the thumbnail image display window shown in FIG. 17 is displayed on the operation unit 150. When the OK key 2202 is pressed, the original data print service execution window shown in FIG. 16 is displayed on the operation unit 150. Then, the flow advances to step S612.

As described above, according to the second embodiment, the contents (thumbnail image) of original data to be processed can be confirmed before processing, in addition to the effect described in the first embodiment. Hence, any operation error can be prevented, and the convenience can be increased.

Third Embodiment

In the first and second embodiments, a processing instruction for original data to be processed is issued from the second image forming apparatus. When the first image forming apparatus searches for original data received from the second image forming apparatus, and at this time, outputs a processing instruction for the original data to the second image forming apparatus, the number of processing steps can be decreased. Hence, the total throughput of the entire system can be increased.

The processing executed by the image forming apparatus according to the third embodiment will be described below with reference to FIG. 19.

Figure 19:
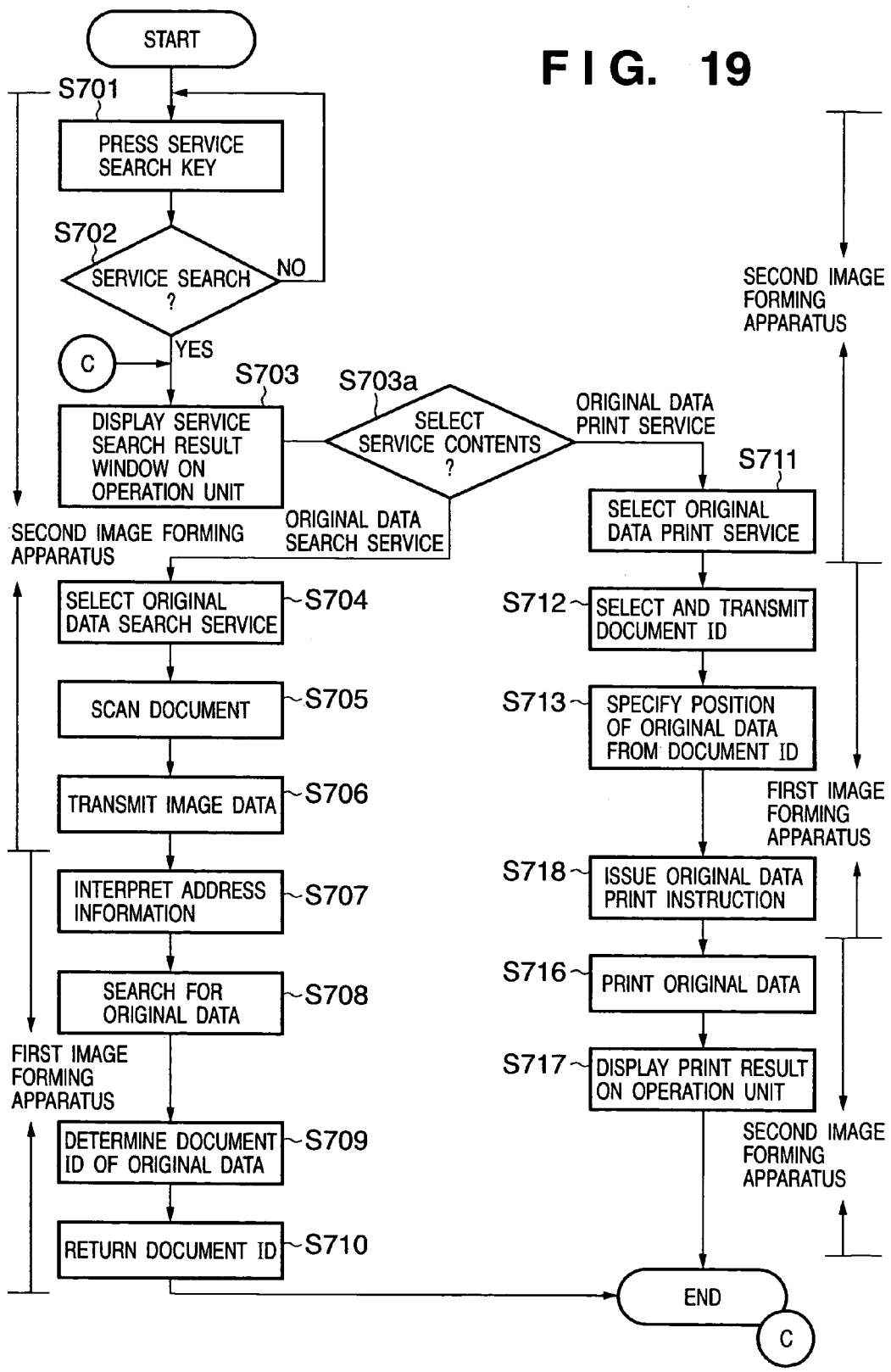
FIG. 19 is a flowchart showing processing executed by an image forming apparatus according to the third embodiment of the present invention.

FIG. 19 is a flowchart showing processing executed by the image forming apparatus according to the third embodiment of the present invention.

FIG. 19 especially shows processing after a service search key 599 is pressed in the basic window in FIG. 8, which is displayed on an operation unit 150 of the second image forming apparatus (image forming apparatus 101).

Steps S701 to S713 and steps S716 and S717 in the flowchart in FIG. 19 correspond to steps S501 to S513 and steps S516 and S517 in FIG. 14, and a detailed description thereof will be omitted. Especially in FIG. 19, step S718 is added to the flowchart in FIG. 14 in place of steps S514 and 515.

Referring to FIG. 19, in step S713, the first image forming apparatus specifies the position information (storage location (address information)) of original data from a received document ID. In step S718, a print instruction for the original data and the original data are transmitted to the second image forming apparatus.

In step S716, upon receiving the print instruction from the first image forming apparatus, the second image forming apparatus prints the received original data.

As described above, according to the third embodiment, the operation of acquiring original data to be processed (printed) can be omitted on the second image forming apparatus side, in addition to the effect described in the first embodiment. Hence, the processing can more efficiently be executed.

Fourth Embodiment

Figure 20:
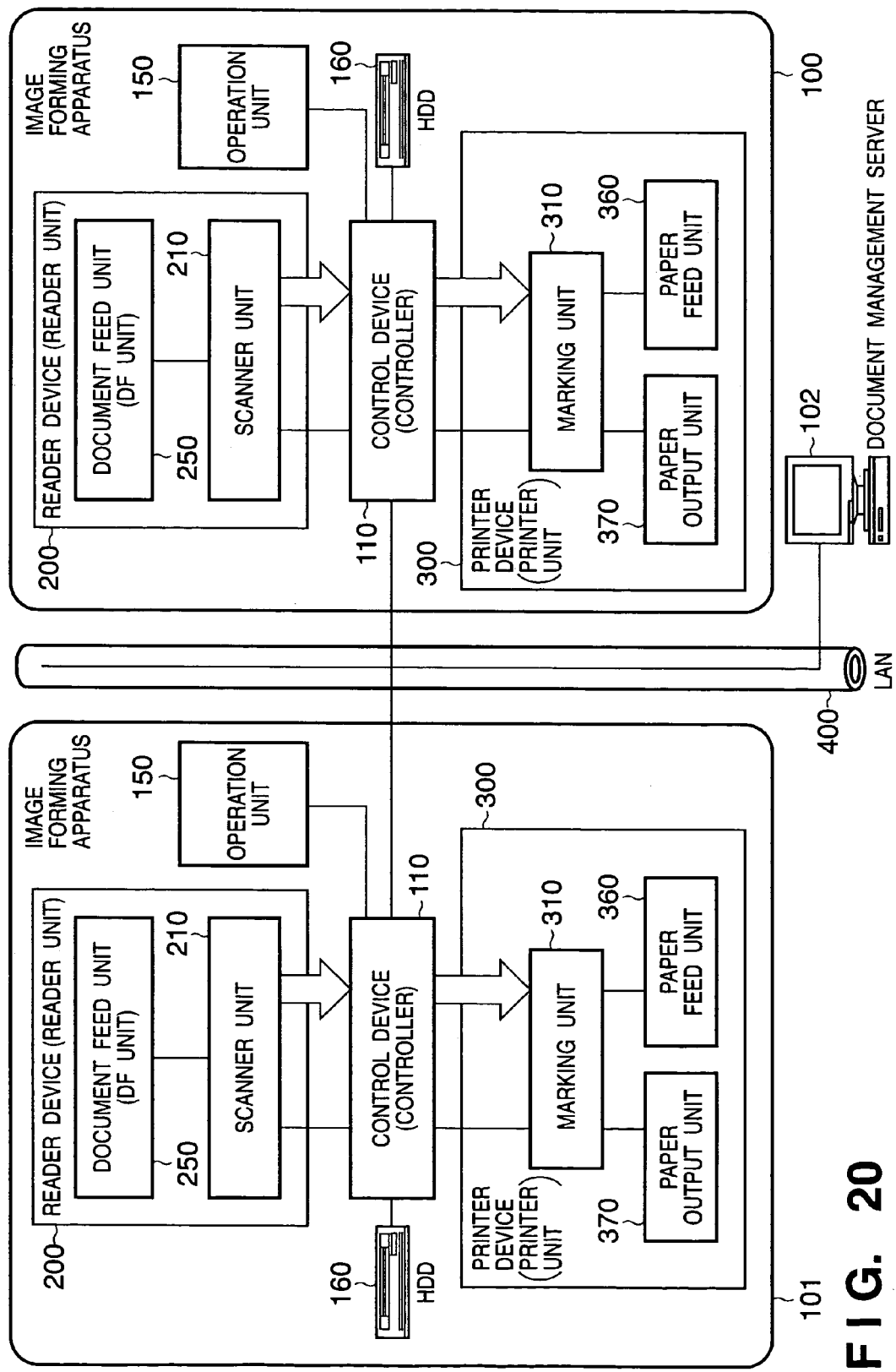
FIG. 20 is a view showing the overall arrangement of an image input/output system according to the fourth embodiment of the present invention.

In the first to third embodiments, original data are stored in the image database formed in the hard disk 160 in the first image forming apparatus (100). As shown in FIG. 20, the image database may be formed in an external device such as a document management server 102 on a LAN 400 accessible from a first image forming apparatus (100) and second image forming apparatus (101).

In this case, the first image forming apparatus appropriately accesses the document management server 102 on the basis of the contents of various kinds of services requested by the second image forming apparatus to acquire original data to be processed. Alternatively, the first image forming apparatus may transmit, to the document management server 102, an instruction to transmit original data to be processed to the second image forming apparatus.

As described above, according to the fourth embodiment, since the image database which stores original data is managed separately by a dedicated server, the resources stored in a hard disk 160 of the first image forming apparatus can efficiently be used, and the processing load on the first image forming apparatus can be reduced, in addition to the effect described in the first embodiment.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-49937 filed on Feb. 25, 2004, the entire contents of which are hereby incorporated by reference herein.

What is claimed is:

1. An image forming apparatus which is connected, through a network, to a first image forming apparatus having a function for obtaining a storage location of original data corresponding to a document image in which location identification information is contained, the image forming apparatus comprising:
   a designation unit adapted to designate a desired function from a plurality of kinds of functions;
   a scan unit adapted to scan the document image containing the location identification information;
   a document image transmission unit adapted to transmit the document image scanned by said scan unit to the first image forming apparatus through the network for causing the first image forming apparatus to obtain the storage location of the original data from the location identification information contained in the transmitted document image and to obtain original data identification information for identifying the original data based on the obtained storage location of the original data in a case where the function designated by said designation unit is the function for obtaining the storage location of the original data;
   an original data identification information reception unit adapted to receive the original data identification information of the original data corresponding to the document image, transmitted by said document image transmission unit, from the first image forming apparatus through the network;
   a selection unit adapted to select the original data identification information received by said original data identification information reception unit based on an instruction for selecting the original data to be received;
   an instruction unit adapted to instruct the first image forming apparatus to search the original data corresponding to the original data identification information selected by said selection unit and to transmit the searched original data to said image forming apparatus; and
   a reception unit adapted to receive the searched original data, corresponding to the original data identification information selected by said selection unit, transmitted from said first image forming apparatus.

2. The apparatus according to claim 1, wherein the plurality of kinds of functions include a search function, print function, saving function, data transmission function, and facsimile transmission function of the original data corresponding to the identification information.

3. The apparatus according to claim 2, wherein said selection unit displays the original data identification information received by said original data identification information reception unit, and
   selects the displayed original data identification information based on the instruction for selecting the original data to be received.

4. The apparatus according to claim 1, further comprising a print unit adapted to print the searched original data received by said reception unit.

5. The apparatus according to claim 1, wherein the original data is managed by one of the first image forming apparatus and an external device on the network.

6. The apparatus according to claim 3, wherein said original data identification information reception unit receives a thumbnail image of the original data in addition to the original data identification information, and
   said selection unit displays the thumbnail image corresponding to the original data identification information.

7. An image forming system formed by connecting a first image forming apparatus having a function for obtaining storage location of original data corresponding to a document image in which identification information is contained, wherein the first image forming apparatus comprises:
   a document image reception unit adapted to receive the document image containing the location identification information from the second image forming apparatus through the network;
   a first obtaining unit adapted to obtain the storage location of the original data from location identification information contained in the document image received by said document image reception unit;
   a second obtaining unit adapted to obtain original data identification information for identifying the original data based on the obtained storage location of the original data;

an original data identification information transmission unit adapted to transmit the original data identification information obtained by the second obtaining unit to the second image forming apparatus through the network;

an instruction reception unit adapted to receive an instruction to search the original data corresponding to the transmitted original data identification information and to transmit the searched original data to the second image forming apparatus through the network; and an original data transmission unit adapted to search the original data corresponding to the transmitted original data identification information and to transmit the searched original data to the second image forming apparatus through the network, and the second image forming apparatus comprises:

a designating unit adapted to designate a desired function from a plurality of kinds of functions;

a scan unit, adapted to scan the document image containing the location identification information;

a document image transmission unit, adapted to transmit the document image scanned by said scan unit to the first image forming apparatus through the network for causing the first image forming apparatus to obtain the storage location of the original data from the location identification information contained in the transmitted document image and to obtain original data identification information for identifying the original data based on the obtained storage location of the original data in a case where the function designated by said designation unit is the function for obtaining the storage location of the original data;

an original data identification information reception unit, adapted to receive original data identification information of the original data corresponding to the document image, transmitted by said document image transmission unit, from the first image forming apparatus through the network;

a selection unit adapted to select the original data identification information received by said original data identification information reception unit based on an instruction for selecting the original data to be received;

an instruction unit adapted to instruct the first image forming apparatus to search the original data corresponding to the received original data identification information selected by said selection unit and to transmit the searched original data to said image forming apparatus; and a reception unit adapted to receive the searched original data, corresponding to the original data identification information selected by said selection unit, transmitted from said first image forming apparatus.

8. A control method of an image forming apparatus which is connected, through a network, to a first image forming apparatus having a function for obtaining a storage location of original data corresponding to a document image in which location identification information is contained, the control method comprising:

a designating step of designating a desired function from a plurality of kinds of functions;

a scan step of scanning the document image containing the location identification information;

a document image transmission step of transmitting the document image scanned in the scan step to the first image forming apparatus through the network for causing the first image forming apparatus to obtain the storage location of the original data from the location identification information contained in the transmitted document image and to obtain original data identification information for identifying the original data based on the obtained storage location of the original data in a case where the function designated by said designation step is the function for obtaining the storage location of the original data;

an original data identification information reception step of receiving original data identification information of the original data corresponding to the document image, transmitted in said document image transmission step, from the first image forming apparatus through the network;

a selection step of selecting the original data identification information received in said original data identification information reception step based on an instruction for selecting the original data to be received;

an instructing step of instructing the first image forming apparatus to search the original data corresponding to the original data identification information selected in said selection step and to transmit the searched original data to said image forming apparatus; and a receiving step of receiving the searched original data, corresponding to the original data identification information selected in said selection step, transmitted from said first image forming apparatus.

9. A computer-readable medium storing a computer program which implements control of an image forming apparatus which is connected, through a network, to a first image forming apparatus having a function for obtaining storage location of original data corresponding to a document image in which location identification information is contained, said program code comprising:

a program code for a designating step of designating a desired function from a plurality of kinds of functions;

a program code for a scan step of scanning the document image containing the location identification information on the basis of the function designated in the designation step;

a program code for a document image transmission step of transmitting the document image scanned in the scan step to the first image forming apparatus through the network for causing the first image forming apparatus to obtain the storage location of the original data from the location identification information contained in the transmitted document image and to obtain original data identification information for identifying the original data based on the obtained storage location of the original data in a case where the function designated by said designation unit is the function for obtaining the storage location of the original data;

a program code for an original data identification information reception step of receiving original data identification information of the original data corresponding to the document image, transmitted in said document image transmission step, from the first image forming apparatus through the network;

a program code for a selection step of selecting the original data identification information received in said original data identification information reception step based on an instruction for selecting the original data to be received;

a program code for an instructing step of instructing the first image forming apparatus to search the original data corresponding to the original data identification information selected in said selection step and to transmit the searched original data to said image forming apparatus; and a program code for a reception step of receiving the searched original data, corresponding to the original data identification information selected in said selection step, transmitted from said first image forming apparatus.

* * * * *